United States Patent
Wang et al.

(10) Patent No.: US 11,941,721 B2
(45) Date of Patent: Mar. 26, 2024

(54) USING WATERMARK INFORMATION AND WEIGHT INFORMATION TO TRAIN AN EMBEDDED NEURAL NETWORK MODEL

(71) Applicant: Alibaba Group Holding Limited, Grand Cayman (KY)

(72) Inventors: Tianhao Wang, Hangzhou (CN); Yongliang Liu, Hangzhou (CN); Qi Zhang, Hangzhou (CN)

(73) Assignee: Alibaba Group Holding Limited

( * ) Notice: Subject to any disclaimer, the term of this patent is extended or adjusted under 35 U.S.C. 154(b) by 113 days.

(21) Appl. No.: 17/722,159

(22) Filed: Apr. 15, 2022

(65) Prior Publication Data

US 2022/0237729 A1 Jul. 28, 2022

Related U.S. Application Data

(63) Continuation of application No. PCT/CN2020/123888, filed on Oct. 27, 2020.

(30) Foreign Application Priority Data

Oct. 29, 2019 (CN) .......................... 201911036839.X

(51) Int. Cl.
*G06T 1/00* (2006.01)
*G06N 3/08* (2023.01)
*G06T 5/50* (2006.01)

(52) U.S. Cl.
CPC .............. *G06T 1/0028* (2013.01); *G06N 3/08* (2013.01); *G06T 1/005* (2013.01); *G06T 5/50* (2013.01);

(Continued)

(58) Field of Classification Search
CPC ................... G06T 1/0028; G06T 1/005; G06T 2201/0065; G06N 3/08; G06N 3/045; G06F 21/16
See application file for complete search history.

(56) References Cited

U.S. PATENT DOCUMENTS 11,042,611 B2 6/2021 Zatloukal
11,163,860 B2 11/2021 Gu et al.
(Continued)

FOREIGN PATENT DOCUMENTS

CN 101389027 A 3/2009
CN 109919303 A 6/2019
(Continued)

OTHER PUBLICATIONS

Translation of International Search Report for corresponding PCT application No. PCT/CN2020/123888 dated May 6, 2021, a counterpart foreign application for U.S. Appl. No. 17/722,159, 2 pages.

(Continued)

*Primary Examiner* — Christopher Wait
(74) *Attorney, Agent, or Firm* — Lee & Hayes P.C.

(57) ABSTRACT

A method and an apparatus for embedding watermark information are disclosed in the present disclosure. The method trains an embedded neural network model using weight information of a target neural network model and target watermark information that is to be embedded into the target neural network model, updates the weight information of the target neural network model according to target watermark embedded data provided by the embedded neural network model, and obtains a target neural network model embedded with the target watermark information. Since the embedded neural network model includes multiple neural network layers, this method increases the complexity of the watermark embedding process, and is able to avoid the problem that watermark information of existing neural network models has poor robustness to watermarking attacks such as overwriting attacks and model compression.

18 Claims, 14 Drawing Sheets

(52) U.S. Cl.
CPC ............... *G06T 2201/0065* (2013.01); *G06T 2207/20084* (2013.01); *G06T 2207/20221* (2013.01)

(56) References Cited

U.S. PATENT DOCUMENTS

| | | | |
|---|---|---|---|
| 11,163,861 B2 | 11/2021 | Poddar et al. | |
| 11,461,577 B2 | 10/2022 | Van Oldenborgh | |
| 11,521,043 B2 | 12/2022 | Uchida et al. | |
| 2010/0067057 A1* | 3/2010 | Guo | G06T 1/0028 358/3.06 |
| 2019/0294955 A1* | 9/2019 | Uchida | G06N 20/20 |
| 2020/0019857 A1 | 1/2020 | Wang et al. | |
| 2021/0019605 A1 | 1/2021 | Rouhani et al. | |

FOREIGN PATENT DOCUMENTS

| | | |
|---|---|---|
| CN | 110168576 A | 8/2019 |
| CN | 110276708 | 9/2019 |
| JP | 2019053541 A | 4/2019 |
| WO | WO2018180263 A1 | 10/2018 |

OTHER PUBLICATIONS

Translation of Written Opinion for corresponding PCT Application No. PCT/CN2020/123888 dated Jan. 27, 2021, a counterpart foreign application for U.S. Appl. No. 17/722,159, 4 pages.

Partial European Search Report and Written Opinion dated Oct. 9, 2023 for European patent application No. 20881797.3, 12 pages.

Nagai, et al., "Digital Watermarking for Deep Neural Networks", arxiv.org, Cornell University Library, 201 Olin Library Cornell University Ithaca, NY 14853, Feb. 6, 2018 XP080857388, DOI: 10.1007/S13735-018-0147-1 p. 2-p. 13.

Zhang, et al., "Protecting, Protecting Intellectual Property of Deep Neural Networks with Watermarking", Proceedings of the 2018 on Asia Conference on Computer and Communications Security, Asiaccs '18; Jun. 4-8, 2018, Jun. 4, 2018 (Jun. 4, 2018), pp. 159-172.

* cited by examiner

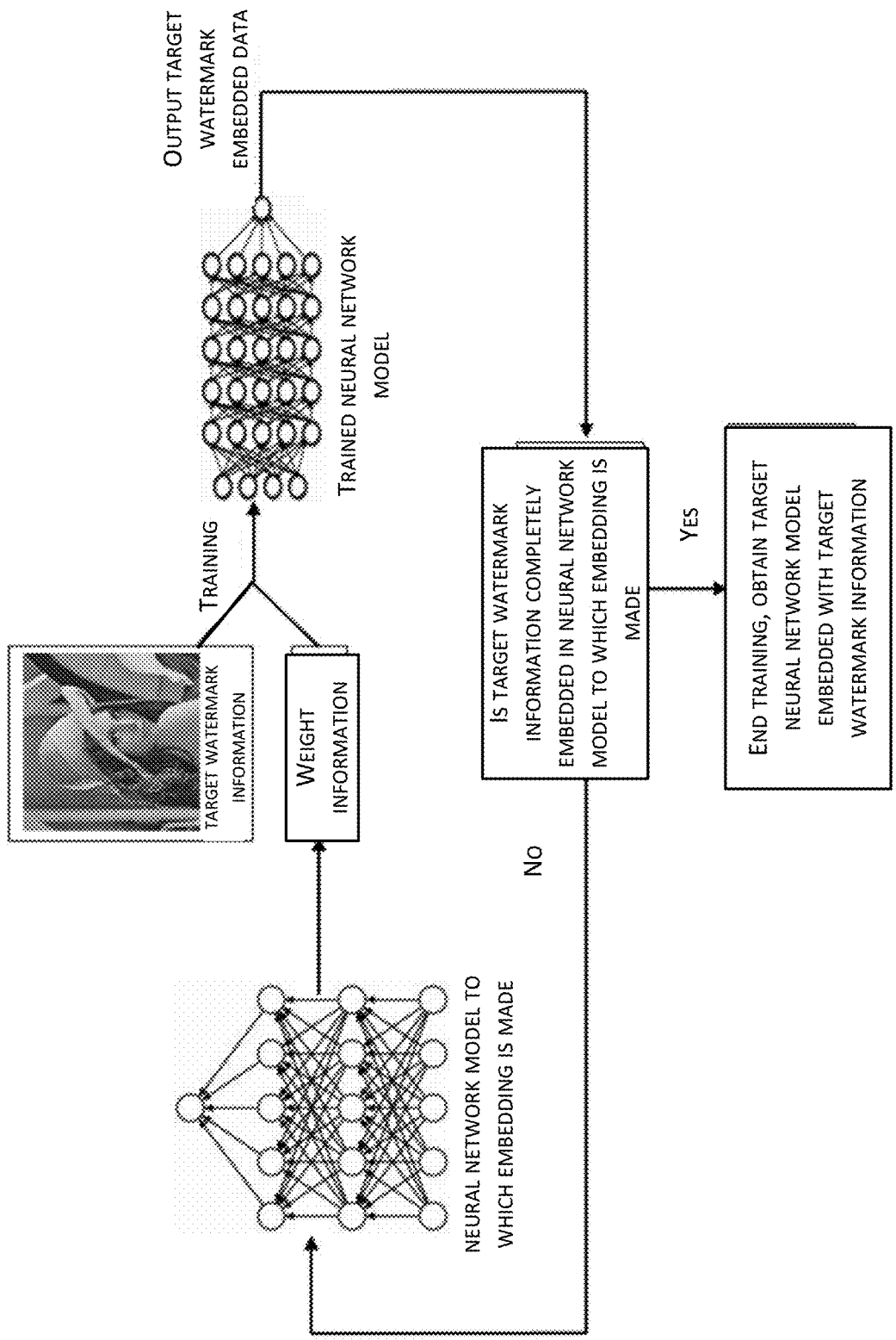
FIG. 1-A

FIG. 1-B

FIG. 1-C

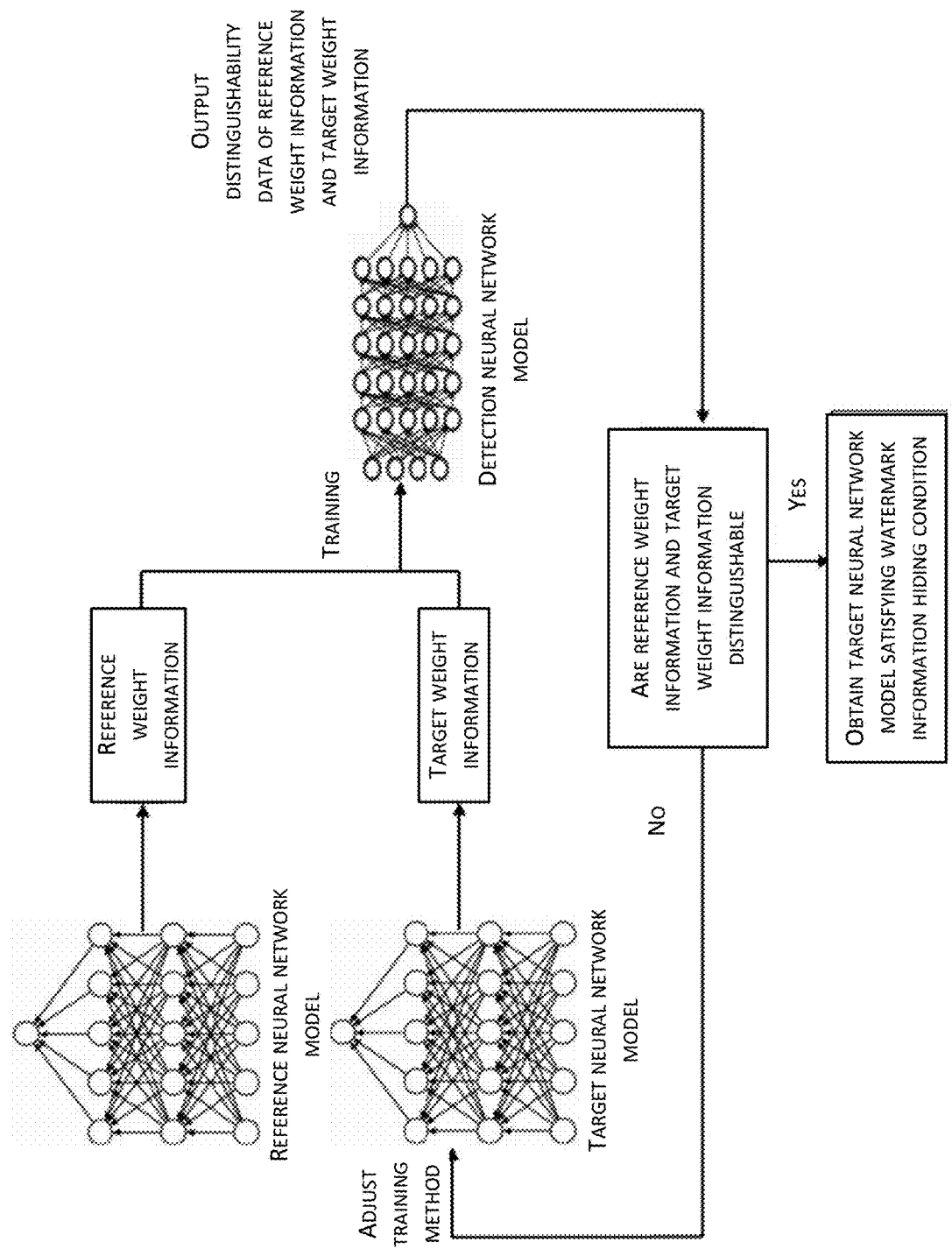
FIG. 2-A

USING WATERMARK INFORMATION AND WEIGHT INFORMATION TO TRAIN AN EMBEDDED NEURAL NETWORK MODEL

CROSS REFERENCE TO RELATED PATENT APPLICATIONS

This application claims priority to and is a continuation of PCT Patent Application No. PCT/CN2020/123888 filed on 27 Oct. 2020, and is related to and claims priority to to Chinese Application No. 201911036839.X, filed on 29 Oct. 2019 and entitled "Watermark Information Embedding Method and Apparatus," which are hereby incorporated by reference in their entirety.

TECHNICAL FIELD

The present disclosure relates to the field of computer technology, and in particular, to watermark information embedding methods. The present disclosure also relates to watermark information embedding apparatuses and electronic devices. The present disclosure further relates to watermark information hiding apparatuses and electronic devices. The present disclosure further relates to watermark information extraction methods, apparatuses and electronic devices. The present disclosure also relates to watermark information embedding systems.

BACKGROUND

Neural network models can be applied to a number of fields, such as speech recognition, natural language processing (NLP), computer vision (CV), big data mining, etc., and can run on a number of carriers, such as computer central processing units (CPU), graphics accelerators (GPU), tensor processors (TPUs), dedicated artificial intelligence chips, cloud computing centers, mobile devices, wearable devices, smart video terminals, in-vehicle devices and other vehicles, Internet of Things devices, etc.

Development costs for neural network include hardware costs such as central processing units (CPUs), graphics processing units (GPUs), etc., software costs such as operating systems, supporting software, and deep learning algorithms, etc., and learning and training costs such as energy and time consumption of data acquisition, data labeling, and development, debugging and operation of learning and training algorithms, etc.

Due to the relatively high development costs as described above, while sharing and promoting a trained neural network model, it is also necessary to protect the intellectual property rights of the neural network model, and embedding watermark information for the neural network model is one of the most effective ways of protection of the property rights.

However, existing neural network watermark embedding algorithms mainly have the following two problems: 1. a weight distribution of an original neural network model is changed after watermark information is embedded in the neural network model, which makes the watermark information in the neural network model easier to be detected; and 2. the embedded watermark information is less robust to watermark attacks such as overwriting attacks and model compression, etc.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

Embodiments of the present disclosure provide a watermark information embedding method and a watermark information hiding method, so as to solve the problems that watermark information in an existing neural network model is easier to be detected, and embedded watermark information is less robust to watermark attacks such as overwriting attacks and model compression, etc. The problem of weak robustness of attack means. Other embodiments of the present disclosure also provide a watermark information embedding apparatus and an electronic device. Other embodiments of the present disclosure also provide a watermark information hiding apparatus and an electronic device. Other embodiments of the present disclosure further provide a watermark information extraction method, a watermark information extraction apparatus, and an electronic device. Other embodiments of the present disclosure also provide a watermark information embedding system.

Embodiments of the present disclosure provide a method for embedding watermark information, which includes: obtaining weight information of a target neural network model; obtaining target watermark information; and using the target watermark information and the weight information of the target neural network model to train an embedded neural network model, and updating the weight information of the target neural network model according to target watermark embedded data provided by the embedded neural network model to obtain the target neural network model embedded with the target watermark information, wherein the embedded neural network model is used for obtaining the target watermark embedded data according to the weight information of the target neural network model, and the target watermark embedded data is used for representing an embedding degree of embedded watermark information in the target neural network model.

In embodiments, using the target watermark information and the weight information of the target neural network model to train the embedded neural network model includes: obtaining weight information of a pre-trained reference neural network model without the watermark information embedded, the reference neural network model and the target neural network having a same structure; obtaining random noise information, the random noise information and the target watermark information having a same structure; and training the embedded neural network model according to the weight information of the reference neural network model, the random noise information, the weight information of the target neural network model and the target watermark information.

In embodiments, training the embedded neural network model according to the weight information of the reference neural network model, the random noise information, the weight information of the target neural network model, and the target watermark information includes: using the weight information of the target neural network model as an instance of a first watermark training set, using the target watermark information as a label of the first watermark training set, and using the weight information of the reference neural network model as an instance of a second watermark training set, and using the random noise information as a label of the second watermark training set; and using the first watermark training set and the second watermark training set as a training set, updating the weight information of the embedded neural network model according to a model loss function of the embedded neural network model until the model loss function converges.

In embodiments, while training the target neural network model, updating the weight information of the target neural network model according to the target watermark embedded data provided by the embedded neural network model to obtain the target neural network model embedded with the target watermark information includes: inputting first weight information of the target neural network model into the embedded neural network model; obtaining first target watermark embedded data outputted by the embedded neural network model, the target watermark embedded data including watermark information extracted from the first weight information of the target neural network model by the embedded neural network model; terminating the training of the embedded neural network model if the first target watermark embedded data indicates that the target watermark information has been embedded in the first weight information, and determining that a target neural network model corresponding to the first weight information as the target neural network model embedded with the target watermark information; training the embedded neural network model if the first target watermark embedded data indicates that the target watermark information is not completely embedded in the first weight information to obtain an embedded neural network model that has completed a first training, and providing the first target watermark embedded data to the target neural network model; updating the weight information of the target neural network model according to the first target watermark embedded data to obtain second weight information of the target neural network model; inputting the second weight information of the target neural network model to the embedded neural network model that completes the first training; and by analogy, until the target neural network model that is completely embedded with the target watermark information and the target watermark information of the embedded neural network model that is able to be extracted from the weight information of the target neural network model are obtained.

In embodiments, training the embedded neural network model to obtain the embedded neural network model that has completed the first training if the first target watermark embedded data indicates that the target watermark information is not completely embedded in the target neural network model, includes: using the first weight information of the target neural network model and the target watermark information as a watermark training set, updating the weight information of the embedded neural network model according to the watermark training set to obtain the embedded neural network model that completes the first training.

In embodiments, training the embedded neural network model to obtain the embedded neural network model that has completed the first training if the first target watermark embedded data indicates that the target watermark information is not completely embedded in the target neural network model, includes: obtaining random noise information, the random noise information having a same structure as the target watermark information; obtaining first weight information of a reference neural network model, the reference neural network and the target neural network having a same structure, and the random noise information being not completely embedded in the first weight information of the reference neural network model; and using the first weight information of the reference neural network model, the random noise information, the first weight information of the target neural network model, and the target watermark information as a watermark training set, and updating the weight information of the embedded neural network model according to the watermark training set to obtain the embedded neural network model that completes the first training.

In embodiments, updating the weight information of the target neural network model according to the target watermark embedded data provided by the embedded neural network model to obtain the target neural network model embedded with the target watermark information includes: obtaining a regular term for embedding the watermark information according to the target watermark embedded data; adding the regular term for embedding the watermark information on a basis of a corresponding model loss function when training the target neural network model using a conventional training set; and updating the weight information of the target neural network based on the model loss function and the regular term for embedding the watermark information, and obtaining the target neural network model embedded with the target watermark information.

Embodiments of the present disclosure also provide a watermark information hiding method, which includes: obtaining reference weight information of a reference neural network model that is not embedded with watermark information; obtaining target weight information of a target neural network model that is embedded with partial watermark information, the reference neural network model and the target neural network model having a same structure; and using the reference weight information and the target weight information as a training set to train a detection neural network model, and adjusting a model training method of the target neural network model according to distinguishability data of the reference weight information and the target weight information outputted by the detection neural network model, and obtaining a target neural network model that satisfies a watermark information hiding condition.

In embodiments, using the reference weight information and the target weight information as the training set to train the detection neural network model, and adjusting the model training method of the target neural network model according to the distinguishability data of the reference weight information and the target weight information outputted by the detection neural network model to obtain the target neural network model that satisfies the watermark information hiding condition, include: using the reference weight information and the first target weight information as the training set to train the detection neural network model; obtaining first distinguishability data of the reference weight information and the first target weight information outputted by the detection neural network model; determining a target neural network model corresponding to the first distinguishability data as the target neural network model that satisfies the watermark information hiding condition if the first distinguishability data indicates that the reference weight information and first target weight information is indistinguishable; providing the first distinguishability data to the target neural network model to allow the target neural network model to update the weight information according to the first distinguishability data and obtain second target weight information if the first distinguishability data indicates that the reference weight information is distinguishable from the first target weight information; using the reference weight information and the second target weight information as a training set to train the detection neural network model; and so forth, until target distinguishability data satisfying a preset watermark information hiding condition is obtained, and a target neural network model corresponding to the target distinguishability data is determined as the target neural network model that satisfies the watermark information hiding condition.

In embodiments, using the reference weight information and the target weight information as the training set to train the detection neural network model includes: sorting the reference weight information, and adding label information that is not embedded with watermark information to the sorted reference weight information; sorting the target weight information, and add label information that is embedded with watermark information to the sorted target weight information; using the sorted reference weight information and the label information thereof as a first training sample, using the sorted target weight information and the label information thereof as a second training sample, training the detection neural network model according to the first training sample and the second training sample, to cause the detection neural network model to be able to distinguish between the reference weight information and the target weight information.

In embodiments, using the reference weight information and the target weight information as the training set to train the detection neural network model includes using the reference weight information and the target weight information as the training set, and updating the weight information of the detection neural network model according to a model loss function of the detection neural network model.

In embodiments, adjusting the model training method of the target neural network model according to the distinguishability data of the reference weight information and the target weight information outputted by the detection neural network model includes: obtaining a regular term used for hiding the watermark information according to the distinguishability information; adding the regular term used for hiding the watermark information on a basis of a corresponding model loss function when using a conventional training set to train the target neural network model and a regular term used for embedding the watermark information, and obtaining a target loss function corresponding to the target neural network model; and updating the weight information of the target neural network model based on the target loss function.

Embodiments of the present disclosure also provide a method for extracting watermark information, which includes: obtaining a target neural network model; obtaining target weight information of the target neural network model; inputting the target weight information into an embedded neural network model to obtain target watermark information outputted by the embedded neural network model, the embedded neural network model being obtained by training according to weight information of the target neural network model when the watermark information is embedded and original watermark information embedded in the target neural network model, and the embedded neural network model being used for obtaining the watermark information embedded in the target neural network model according to the weight information of the target neural network model; and matching the target watermark information with the original watermark information embedded in the target neural network model, and determining whether the target watermark information is the watermark information embedded in the target neural network model.

Embodiments of the present disclosure also provide an apparatus for embedding watermark information, which includes: a weight information acquisition unit used for obtaining weight information of a target neural network model; a target watermark information acquisition unit used for obtaining target watermark information; an embedded neural network model training unit used for using the target watermark information and the weight information of the target neural network model to train an embedded neural network model, the embedded neural network model being used for obtaining embedding degree information of watermark information embedded in the target neural network model according to the weight information of the target neural network model; and a target neural network model acquisition unit used for updating the weight information of the target neural network model according to the embedding degree information provided by the embedded neural network model, and obtaining a target neural network model embedded with the target watermark information.

Embodiments of the present disclosure further provide an electronic device, which includes: a processor and a memory, the memory being used for storing a watermark information embedding program, and the program, when being read and executed by the processor, performing the following operations: obtaining weight information of a target neural network model; obtaining target watermark information; using the target watermark information and the weight information of the target neural network model to train an embedded neural network model, the embedded neural network model being used for obtaining target watermark embedded data according to the weight information of the target neural network model, and the target watermark embedded data being used for representing an embedding degree of embedded watermark information in the target neural network model; and updating the weight information of the target neural network model according to the target watermark embedded data provided by the embedded neural network model, and obtaining a target neural network model embedded with the target watermark information.

Embodiments of the present disclosure further provide a watermark information hiding apparatus, which includes: a reference weight information acquisition unit used for obtaining reference weight information of a reference neural network model that is not embedded with watermark information; a target weight information acquisition unit used for obtaining target weight information of a target neural network model that is embedded with partial watermark information, the reference neural network model and the target neural network model having a same structure; and a target neural network model acquisition unit used for using the reference weight information and the target weight information as a training set to train a detection neural network model, and adjusting a model training method of the target neural network model according to distinguishability data of the reference weight information and the target weight information outputted by the detection neural network model, and obtaining a target neural network model that satisfies a watermark information hiding condition.

Embodiments of the present disclosure also provide an electronic device, including: a processor and a memory, the memory being used for storing a watermark information hiding program, and the program when being read and executed by the processor, performing the following operations: obtaining reference weight information of a reference neural network model that is not embedded with watermark information; obtaining target weight information of a target neural network model that is embedded with partial watermark information, the reference neural network model and the target neural network model having a same structure; and using the reference weight information and the target weight information as a training set to train a detection neural network model, and adjusting a model training method of the target neural network model according to distinguishability data of the reference weight information and the target weight information outputted by the detection neural network model, and obtaining a target neural network model that satisfies a watermark information hiding condition.

Embodiments of the present disclosure further provide an apparatus for extracting watermark information, which includes: a target neural network model acquisition unit used for obtaining a target neural network model; a target weight information acquisition unit used for obtaining target weight information of the target neural network model; a target watermark information acquisition unit used for inputting the target weight information into an embedded neural network model to obtain target watermark information outputted by the embedded neural network model, the embedded neural network model being obtained by training according to weight information of the target neural network model when the watermark information is embedded and original watermark information embedded in the target neural network model, and the embedded neural network model being used for obtaining the watermark information embedded in the target neural network model according to the weight information of the target neural network model; and a watermark information matching unit used for matching the target watermark information with the original watermark information embedded in the target neural network model, and determining whether the target watermark information is the watermark information embedded in the target neural network model.

Embodiments of the present disclosure also provide an electronic device, including: a processor and a memory, the memory being used for storing a watermark information extraction program for a neural network, and the program, when being read and executed by the processor, performing the following operations: obtaining a target neural network model; obtaining target weight information of the target neural network model; inputting the target weight information into an embedded neural network model to obtain target watermark information outputted by the embedded neural network model, the embedded neural network model being obtained by training according to weight information of the target neural network model when the watermark information is embedded and original watermark information embedded in the target neural network model; the embedded neural network model being used for obtaining the watermark information embedded in the target neural network model according to the weight information of the target neural network model; and matching the target watermark information with the original watermark information embedded in the target neural network model, and determining whether the target watermark information is the watermark information embedded in the target neural network model.

The present disclosure also provides a watermark information embedding system, which includes:

a data acquisition module, a watermark information embedding module, a watermark information hiding module, and a target neural network model updating module;

the data acquisition module being used for obtaining original weight information of a target neural network model; obtaining target watermark information; obtaining reference weight information of a reference neural network model; obtaining random noise data; providing the reference weight information and the noise data to the watermark information embedding module; and providing the reference weight information to the watermark information hiding module, the target neural network model and the reference neural network model having the same network structure;

the watermark information embedding module being used for training an embedded neural network model using the target watermark information, the original weight information, the reference weight information and the noise data as an embedded watermark training set, and obtaining the target watermark embedded data outputted by the embedded neural network model, the target watermark embedded data being used to represent an embedding degree of embedded watermark information in the target neural network model; and providing the target watermark embedded data to the neural network model updating module;

the watermark information hiding module being used for training a detection neural network model using the weight information embedded with watermark information and the reference weight information provided by the neural network model updating module as a hidden watermark training set, and obtaining distinguishability data of the weight information embedded with the watermark information and the reference weight information outputted by the detection neural network model; and providing the distinguishability data to the neural network model updating module; and the neural network model updating module being used for updating the weight information of the target neural network model in a manner that enables the target neural network model to achieve predetermined functions thereof, updating the weight information of the target neural network model on a basis thereof according to target watermark embedded data provided by the watermark information embedding module, and obtaining the weight information embedded with the watermark information; providing the weight information embedded with the watermark information to the watermark information hiding module; and updating the weight information of the target neural network model according to the distinguishability data provided by the watermark information hiding module, and obtaining a target neural network model embedded with the target watermark information and satisfying a watermark information hiding condition.

Compared with existing technologies, the present disclosure has the following advantages:

The watermark information embedding method for neural networks provided by the present disclosure trains an embedded neural network model through weight information of a target neural network model and target watermark information to be embedded in the target neural network model, updates the weight information of the target neural network model according to target watermark embedded data provided by the embedding neural network model, and obtain a target neural network model embedded with the target watermark information. Since an embedded neural network includes multiple neural network layers, this method increases the complexity of a watermark embedding process and can avoid the problem that watermark information of existing neural network models has poor robustness to watermarking attacks such as overwriting attacks and model compression.

Furthermore, the watermark information hiding method for neural networks provided by the present disclosure trains a detection neural network model through reference weight information of a reference neural network model that is not embedded with watermark information and target weight information of a target neural network model that is undergoing a process of embedding the watermark information. According to distinguishability data between the reference weight information and the target weight information outputted by the detection neural network model, a model training method of a target neural network is adjusted to obtain a target neural network model that satisfies watermark information hiding conditions. This method is based on ideas of adversarial training of neural networks, which enhances the concealment of watermark information in a target neural network model, and avoids the problem that watermark information is easier to be detected after the watermark information is embedded in an existing neural network model.

BRIEF DESCRIPTION OF THE DRAWINGS

FIG. 1-A is a schematic diagram of watermark information embedded in a target neural network model provided by the first embodiment of the application.

FIG. 1-B is a schematic diagram of original watermark information to be embedded in a deep neural network model provided by the first embodiment of the present disclosure.

FIG. 1-C is a schematic diagram of watermark information extracted from weight information of a deep neural network model provided by the first embodiment of the present disclosure.

FIG. 2-A is a schematic diagram of watermark information embedded in a hidden target neural network model provided by the second embodiment of the present disclosure.

DETAILED DESCRIPTION

Figure 1:
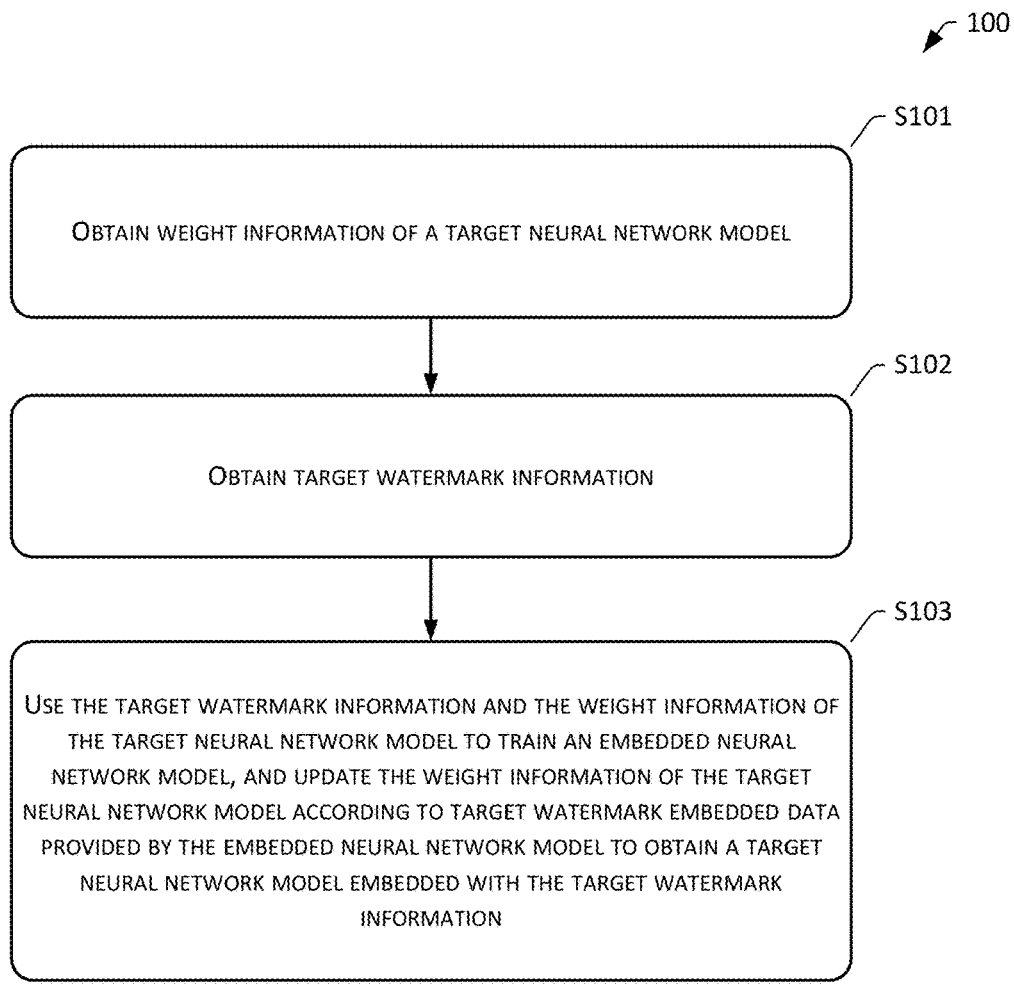
FIG. 1 is a flowchart of a method for embedding watermark information provided by a first embodiment of the present disclosure.

In the following description, numerous specific details are set forth in order to provide a thorough understanding of the present disclosure. However, the present disclosure can be implemented in many other ways that are different from those described herein. One skilled in the art can make similar promotions without departing from the connotation of the present disclosure. Therefore, the present disclosure is not limited by specific implementations disclosed below.

A typical existing watermark embedding algorithm for neural network models is: adding a special regular term in a training process to embed watermark information into weight information. Such solution can make a process of embedding watermark information and a process of training a neural network model to be carried out at the same time, so that the embedded watermark information does not affect the performance of the neural network model. However, in this method, an embedding matrix is responsible for mapping weight information of a neural network model to target watermark information. Specifically, a simple linear transformation is performed on the weight information of the neural network model through a target embedding matrix. If the weight information is regarded as the input, the process of linear mapping is the same as the process of passing weight information through a single-layer neural network. In this case, other entities can generate an embedding matrix of the same dimension simply and randomly, and embed other watermark information in the neural network model. Due to the simplicity of linear mapping, the generated embedding matrix of the same dimension is higher similar to the target embedding matrix, so that other embedded watermark information can cover and delete the target watermark information. Therefore, this type of watermark embedding algorithm will leave traces in the statistical distribution information of the weights of the neural network model, which makes the process of detecting the watermark information extremely easy, failing to meet the concealment requirements of digital watermarks, and having relatively poor robustness to watermark attacks such as overwriting attacks and model compression, etc.

For a watermark information embedding scenario of a neural network model, in order to improve the robustness of the embedded watermark information to watermark attack methods such as overwriting attacks and model compression, etc., and to enhance the concealment of the watermark information embedded in the neural network model, the present disclosure provides a watermark information embedding method, and a watermark information embedding apparatus and an electronic device corresponding to the method, a watermark information hiding method, and a watermark information hiding apparatus and an electronic device corresponding to such method. The present disclosure also provides a watermark information extraction method, and a watermark information extraction apparatus and an electronic device corresponding to the method. The present disclosure additionally provides a watermark information embedding system. Embodiments are provided below to describe the methods, apparatuses, electronic devices and systems in detail.

The first embodiment of the present disclosure provides a method for embedding watermark information. An application entity of this method can be an application of a computing device used for embedding watermark information into a neural network model. FIG. 1 is a method 100 for embedding watermark information provided by the first embodiment of the present disclosure. FIG. 1-A is a schematic diagram of embedding watermark information in a target neural network model provided by the first embodiment of the application. The method provided by this embodiment is described in detail below with reference to FIG. 1 and FIG. 1-A. Embodiments involved in the following description are used to illustrate the principles of the method, and not to limit the practical uses thereof.

As shown in FIG. 1, the method 100 for embedding watermark information provided by this embodiment includes the following steps:

S101: Obtain weight information of a target neural network model.

A neural network model learns and masters the data processing capability for input signals through multi-layer feature extraction and by adjusting and optimizing neural network parameters. The input signals can be digital signal samples of multimedia information such as voice, image, video, etc. The digital signal samples and the network structure determine the type of the data processing capability of the neural network, and the parameters of the neural network determine the pros and cons of the data processing capability. Neural networks include various forms of network structures, such as a convolutional neural network (CNN), a recurrent neural network (RNN), a generative adversarial network (GAN), etc. A digital convolution operation is the core operation of various types of neural network models. It calculates, in a sliding window, the weighted weight value of an input digital signal according to parameters of a convolution kernel of the network, which is used as the input to the next layer. Different parameters determine different weighted weight values. In a convolution layer of the neural network, a smaller-sized convolution kernel is used to cover the entire dimensional space of the input digital signal in a sliding manner, and in the fully connected layer, a full-sized convolution kernel is used to calculate the weighted weight value of the input digital signal.

The target neural network model (the neural network model to be embedded in FIG. 1-A, and the target neural network is used to represent such model in the following test) refers to the neural network model to be embedded with the watermark information, and the weight information of the target neural network model refers to the statistical distribution information of weight values in the neural network model to be embedded with the watermark information.

S102: Obtain target watermark information.

The target watermark information refers to the watermark information to be embedded in the above target neural network model, which may be a predetermined bit value or predetermined image information.

S103: Use the target watermark information and the weight information of the target neural network model to train an embedded neural network model, and update the weight information of the target neural network model according to target watermark embedded data provided by the embedded neural network model to obtain a target neural network model embedded with the target watermark information.

After the weight information of the target neural network model and the target watermark information to be embedded in the target neural network model are obtained in the above steps, this step is used to train the embedded neural network model (Embedder, a training neural network model in FIG. 1-A, which can be used to assist the target neural network model to embed the target watermark information, and the embedded neural network model is used to represent such model hereinafter) according to the weight information and target watermark information. The weight information of the target neural network model is updated based on the target watermark embedded data provided by the embedded neural network model, and the target neural network model embedded with the target watermark information is obtained.

The embedded neural network model is a neural network model including multiple neural network layers. After training, the embedded neural network model can be used to output target watermark embedded data according to the weight information of the target neural network model that is inputted. The target watermark embedded data is used to represent an embedding degree of the watermark information embedded in the target neural network model. In this embodiment, the target watermark embedded data includes the watermark information that has already been embedded in the target neural network model.

In this embodiment, while training the target neural network model, the embedded neural network model is trained. A purpose thereof is to enable the embedded neural network model to map the weight information of the target neural network model to the target watermark information to be embedded. Specifically, the embedded neural network model is trained according to the target watermark information and the weight information of the target neural network model, and the weight information of the embedded neural network model is updated according to a model loss function.

In this embodiment, the process of obtaining the target neural network model embedded with the target watermark information is synchronized with the training process of the embedded neural network model, that is, the processes of training the target neural network model, training the embedded neural network model, and obtaining the target neural network embedded with the target watermark information are all performed synchronously. Before training the embedded neural network model and training the target neural network, it is necessary to obtain reference weight information and random noise information of a reference neural network model. The reference neural network model has the same structure as that of the target neural network model, and the random noise information and the target watermark information has the same structure. For example, the target watermark information is a 20-bit bit value, and the random noise information is also a randomly generated 20-bit bit value.

The method of training an embedded neural network includes: before training a target neural network model, pre-training a neural network model having the same structure as the target neural network model but without watermark information as a reference neural network model; obtaining an untrained embedded neural network model; and using target watermark information, weight information of the target neural network model, reference weight information and random noise information as a watermark training set, and performing model training on the untrained embedded neural network model. In this embodiment, the process specifically includes: using the weight information of the target neural network model as an instance of the first watermark training set, using the target watermark information as a label of the first watermark training set, and using the weight information of the reference neural network model as an instance of a second watermark training set, and using the random noise information as a label of the second watermark training set; using the first watermark training set and the second watermark training set as a training set, updating the weight information of the embedded neural network model according to a model loss function of the embedded neural network model until the model loss function converges.

After the above training (after the model loss function converges), the embedded neural network model can output random noise information or watermark information (label) corresponding to weight information (instance) that is inputted.

In this embodiment, since the weight information of the reference neural network and random noise information are added in the process of training the embedded neural network, when the trained embedded neural network model needs to satisfy the input data being the weight information of the target watermark information that has not been embedded, the weight information can be mapped to random noise information in order to avoid false alarms. For example, for the weight information of the neural network model without watermark information, the embedded neural network model will not extract meaningful watermark information therefrom. Moreover, increasing the amount of data during the model training process can prevent the model from overfitting. In this embodiment, using an embedded neural network model with multiple neural network layers can enable mapping the weight information and the watermark information through a nonlinear mapping method. Compared with the embedded matrix, using the embedded neural network model with multiple neural network layers can make the embedding process of the watermark information more complicated, increase the flexibility of the form of the embedded watermark information, and improve the robustness of the embedded watermark information.

In this embodiment, when training the embedded neural network model using the target watermark information and the weight information of the target neural network model, the training is performed with the weight information of the target neural network model updated in real time. The process of updating the weight information of the target neural network model using the target watermark embedded data provided by the embedded neural network model and obtaining the target neural network model embedded with the target watermark information is an iterative training process. In this iterative training process, the embedded neural network model is cross-trained with the target neural network model, and the training set of one neural network model will change with changes of the other neural network model until loss functions of both neural network models converge.

For example, the weight information of the embedded neural network is updated according to the following model loss function (2):

$$\hat{\theta} = \min_{\theta}(\text{Distance}(m^{wm}, \text{Embedder}(w, \theta)) + \text{Distance}(m^{random}, \text{Embedder}(w^{unwm}, \theta))) \quad (2)$$

The meaning of each parameter in the formula is:
$m^{wm}$: target watermark information;
$m^{random}$: random noise information;
Embedder: an embedded neural network model;
$\theta$ is weight information of the embedded neural network model;
w: weight information of a target neural network model;
$w^{unwm}$: weight information of a reference neural network model;
Distance: used for comparing a degree of similarity between two pieces of information.

The process of updating $\theta$ is the process of training the embedded neural network model (Embedder), so that the embedded neural network model (Embedder) can map the weight information (w) of the target neural network model to the target watermark information ($m^{wm}$), and map the weight information of the reference neural network model ($w^{unwm}$) to random noise information ($m^{random}$).

The above-mentioned process of obtaining the target neural network model embedded with the target watermark information may specifically be: obtaining a regular term used for embedding the watermark information according to the target watermark embedded data; and adding the regular term used for embedding watermark information on the basis of a corresponding model loss function when the target neural network model is trained using a conventional training set, updating the weight information of the target neural network based on the model loss function and the regular term used for embedding watermark information, and obtaining the target neural network model embedded with the target watermark information. For example, the weight information of the target neural network model is updated according to the following formula (3):

$$\hat{w} = \min_{w}\left(\text{loss}_o(w) + \lambda \underbrace{\text{Distance}(m, \text{Embedder}(w, \theta))}_{\text{loss}_{embed}}\right) \quad (3)$$

The meaning of each parameter in formula (3) is:
$\text{loss}_o$: the loss function of the target neural network model;
$\text{loss}_{embed}$: the regular term used for embedding the watermark information, which includes watermark information extracted by the embedded neural network model (Embedder) from the weight information of the target neural network model;
$\lambda$: the coefficient of the regular term ($\text{loss}_{embed}$) to adjust the balance between the regular term and the loss function ($\text{loss}_o$).

In this embodiment, the above-mentioned iterative training process specifically includes the following content:

A: During the process of training the target neural network model using the conventional training set so that the target neural network model can realize its predetermined function, first weight information of the target neural network model is inputted into the embedded neural network model.

B: First target watermark embedded data outputted by the embedded neural network model is obtained, and the target watermark embedded data includes watermark information extracted by the embedded neural network model from the first weight information of the target neural network model.

C: If the first target watermark embedded data indicates that the target watermark information has been embedded in the first weight information, the training of the embedded neural network model is terminated, and the target neural network model corresponding to the first weight information is determined as the target neural network model embedded with the target watermark information. For example, if the first target watermark embedded data is the watermark information extracted from the first weight information by the embedded neural network model, and the watermark information is the same as the target watermark information, this indicates that the target watermark information has been embedded in the first weight information.

D: If the first target watermark embedded data indicates that the target watermark information is not completely embedded in the first weight information, the embedded neural network model is trained to obtain the embedded neural network model that has completed the first training, and the first target watermark embedded data is provided to the target neural network model. For example, the first weight information of the target neural network model and the target watermark information is used as a watermark training set. The weight information of the embedded neural network model is updated according to the watermark training set, and the embedded neural network model that has completed the first training is obtained, that is, the parameters of the embedded neural network model are updated once according to the watermark training set. In this embodiment, the process of training the embedded neural network model specifically is: obtaining the first weight information of the reference neural network model, the first weight information of the reference neural network model being not completely embedded with the random noise information, using the first weight information of the reference neural network model, the random noise information, the first weight information of the target neural network model, and the target watermark information as a watermark training set, and updating the weight information of the embedded neural network model according to the watermark training set to obtain the embedded neural network model that has completed the first training.

E: The weight information of the target neural network model is updated according to the first target watermark embedded data to obtain second weight information of the target neural network model. Specifically, the training set of the target neural network model is adjusted according to the first target watermark embedded data, and during the training process, the weight information of the target neural network model is updated according to the adjusted training set.

F: The second weight information of the target neural network model is inputted into the embedded neural network model that has completed the first training.

G: Second target watermark embedded data outputted by the embedded neural network model that has completed the first training is obtained.

H: If the second target watermark embedded data indicates that the target watermark information is not fully embedded in the second weight information, the training of the embedded neural network model is continued to obtain the embedded neural network model that has completed the second training, and the second target watermark embedded data is provided to the target neural network model.

I: By analogy, until a target neural network model fully embedded with the target watermark information and an embedded neural network model capable of extracting the target watermark information from the weight information of the target neural network model are obtained.

In this embodiment, the precision of the embedded watermark information can also be adjusted according to the function or usage scenario of the neural network model. Specifically, the process may be: according to the function or usage scenario of the target neural network model, setting the number of iterations of the iterative training corresponding thereto, or setting a termination condition for the target watermark embedded data corresponding thereto. For example, when the target neural network model has many functions or usable scenarios, the method of embedding watermark information is high-precision embedding. Specifically, the number of iterations of the above iterative training can be set to be the full number of iterations. For example, if the number of iterations required for iterative training is 5, the number of iterations of iterative training is then preset to be 5, or the termination condition for the target watermark embedded data is set as terminating the training when the target watermark information is completely embedded in the weight information. When the target neural network model has a single function and a relatively few number of usable scenarios, the method of embedding watermark information is low-precision embedding. For example, the number of iterations of the iterative training is preset to be 3, or the termination condition for the target watermark embedded data is set as terminating the training when 60% of the target watermark information is embedded in the weight information. In this way, the target neural network model can be embedded in the target watermark information in a dynamic and adaptable manner.

In this embodiment, the levels of intellectual property protection requirements corresponding to neural network models can also be determined according to values of different types of the neural network models. When the neural network model is embedded with the watermark information, the precision of the embedded watermark information is adjusted according to the level of the intellectual property protection requirement. For example, when the intellectual property protection requirement corresponding to the target neural network model is relatively high, the number of iterations of the above-mentioned iterative training can be set to be the full number of iterations, or the termination condition for the target watermark embedded data can be set as terminating the training when the weight information is completely embedded in the target watermark information. When the intellectual property protection requirement corresponding to the target neural network model is relatively low, the number of iterations of the above iterative training is set to be not the full number of iterations, or the termination condition for the target watermark embedded data set as terminating the training when the amount of data of the weight information that is embedded reaches a predetermined proportion of the target watermark information.

In this embodiment, before using the above method to embed the target watermark information in the weight information of the target neural network model, some nodes or neural network layers of the target neural network model may be deleted. The deleted nodes or neural network layers may be a node or neural network layer that has a weak correlation with the main function of the model, and target watermark information is written at the corresponding position of the deleted node or neural network layer in the target neural network model. In this way, a second embedding of the target watermark information can be realized, which increases the complexity of embedding the watermark information in the target neural network model.

Model training for deep neural network models is a daunting task, and implementing this process requires a large amount of data and time. With the rapid development of technologies related to deep neural network models, it has become increasingly important to share and promote trained deep neural network models. For example, to train a ResNet (residual network) with a deep network structure based on the dataset of ImageNet (a large-scale visualization database for visual object recognition software research), the process requires a relatively large amount of time even with the latest GPU (graphics processing unit). Therefore, sharing and promoting the trained deep neural network models can maximize the utilization of resources. For example, similar to video sharing websites, through a systematic deep neural network model sharing platform or an e-commerce platform used for purchasing and selling trained deep neural network models, methods such as fine-tuning (using existing models to train other data sets) or migration learning, etc., can be adopted to make the trained deep neural network models to be directly applicable to other applications. The trained deep neural network models are provided to other applications with usage requirements.

Due to the high time cost and information transmission cost (for example, a mobile application remotely connects to a server for each predictive query, which greatly reduces the usage efficiency of the mobile application), in many cases, developers need to embed deep neural network models into mobile applications for fast response to predictive queries. However, such setting enables an attacker to simply extract model parameters of a deep neural network model from program codes, and modify the deep neural network model by methods such as migration learning, etc., so as to take the deep neural network model as his/her own, and use it for commercial purposes.

In order to protect the intellectual property of deep neural network models in the process of sharing and promoting the deep neural network models, and to prevent the deep neural network models from being stolen and used for other commercial purposes after they are embedded in applications, in this embodiment, when training a deep neural network model, an embedded neural network model including multiple neural network layers is used to embed watermark information in the deep neural network model, which makes the process of embedding the watermark information more complicated, and can enable the detection of infringement of the deep neural network model to be performed effectively. For example, as shown in FIG. 1-B and FIG. 1-C, FIG. 1-B is the original watermark information to be embedded in a deep neural network model, and FIG. 1-C is the watermark information extracted from the weight information of the deep neural network model after embedding the original watermark information in the deep neural network model using the watermark information embedding method provided by this embodiment. As can be seen from FIG. 1-B and FIG. 1-C, the original watermark information to be embedded is consistent with the extracted watermark information. Moreover, using the above fine-tuning method, after modifying the deep neural network model embedded with the watermark information separately using the same data set and different data sets, the extracted watermark information does not change significantly from the original watermark information to be embedded. Moreover, after the neural network model embedded with the watermark information is compressed, the extracted watermark information does not change significantly from the original watermark information to be embedded. Furthermore, using the same method as the watermark information embedding method provided in this embodiment or other watermark information embedding methods to overwrite the watermark information embedded in this embodiment, the extracted watermark information is not affected.

In the watermark information embedding method provided in this embodiment, an embedded neural network model is trained using weight information of a target neural network model and target watermark information to be embedded in the target neural network model. The weight information of the target neural network model is updated according to target watermark embedded data provided by the embedded neural network model, and a target neural network model embedded with the target watermark information is obtained. Since the embedded neural network model includes multiple neural network layers, this method increases the complexity of the watermark embedding process and can avoid the problem of relatively poor robustness of watermark information in existing neural network models with respect to watermark attack methods such as overwriting attacks and model compression.

Figure 2:
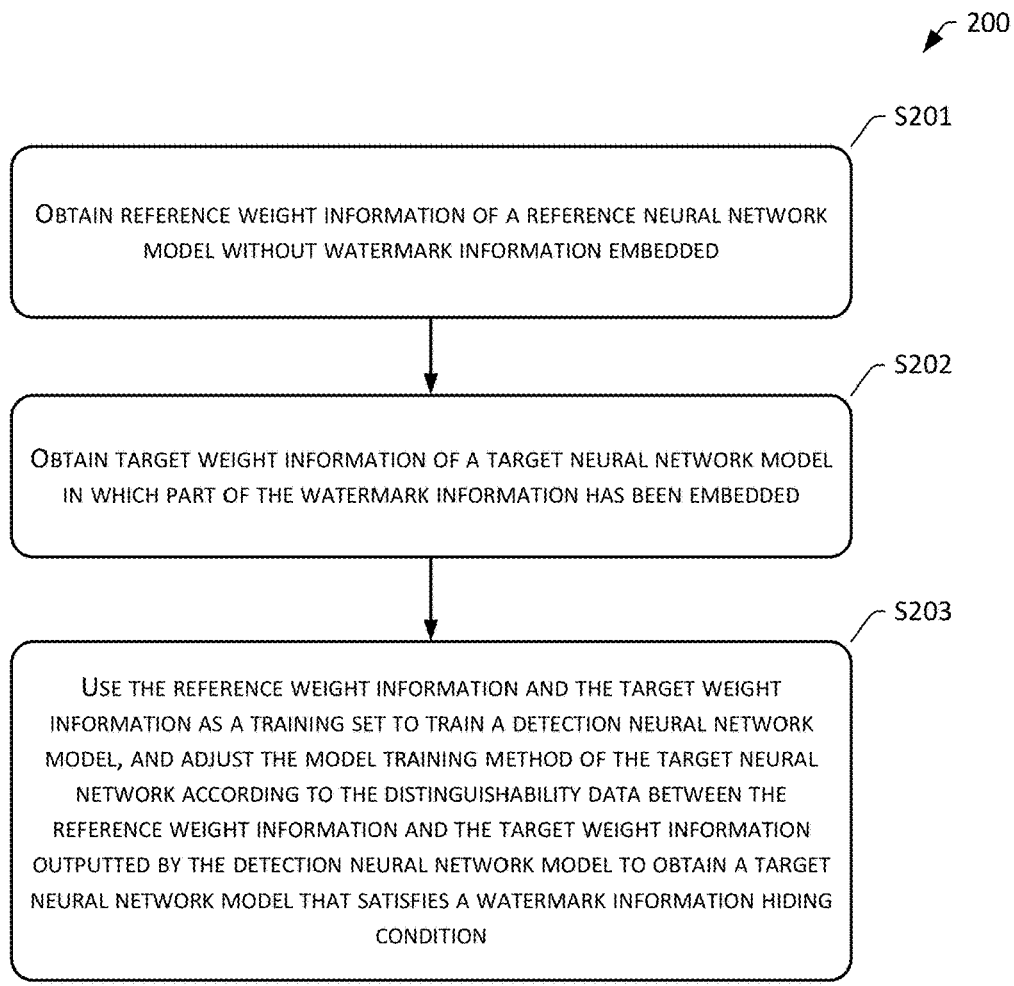
FIG. 2 is a flowchart of a method for hiding watermark information provided by a second embodiment of the present disclosure.

A second embodiment of the present disclosure provides a watermark information hiding method, and an implementation entity of the method may be an application of a computing device used for hiding watermark information embedded in a neural network. FIG. 2 is a flowchart of a watermark information hiding method provided by the second embodiment of the present disclosure. FIG. 2-A is a schematic diagram of watermark information embedded in a hidden target neural network model provided by the second embodiment of the present disclosure. The method provided in this embodiment is described in detail using FIG. 2 and FIG. 2-A. As shown in FIG. 2, a watermark information hiding method 200 provided by this embodiment includes the following steps:

S201: Obtain reference weight information of a reference neural network model without watermark information embedded.

The reference neural network model may be equivalent to the reference neural network model in the first embodiment. For the content of the reference neural network, reference can be made to the first embodiment, which will not be repeated herein.

S202: Obtain target weight information of a target neural network model in which part of the watermark information has been embedded.

For example, the target weight information of the target neural network model in which part of the watermark information has been embedded can be obtained during the process in which the target neural network model in the first embodiment is not completely embedded with the target watermark information.

The reference neural network model and the target neural network model have the same structure. In this embodiment, before starting to train the target neural network model, pre-training can be performed on the reference neural network model that has the same structure as the target neural network model without adding watermark information, and the weight information of the reference neural network model is obtained.

S203: Use the reference weight information and the target weight information as a training set to train a detection neural network model, and adjust the model training method of the target neural network according to the distinguishability data between the reference weight information and the target weight information outputted by the detection neural network model to obtain a target neural network model that satisfies a watermark information hiding condition.

The detection neural network model is an ordinary neural network model. The input of the trained detection neural network model is sorted target weight information of a watermark embedding layer of the target neural network model, and the output is distinguishability data. In this embodiment, the distinguishability data is a probability value between 0 and 1, and is used to judge whether the reference weight information and the target weight information is distinguishable, so as to judge whether the target weight information that is inputted includes watermark information.

The training process of the detection neural network model and the training process of the target neural network model when embedding watermark information are the processes of adversarial training, that is, while training the target neural network model (the process of embedding watermark information), the detection neural network model is trained at the same time. The purpose of training the detection neural network model is to enable it to distinguish the target weight information after embedded with the watermark information from the reference weight information without the watermark information. When embedding a watermark in the target neural network model, data its weight information is further updated according to the distinguishability data fed back by the detection neural network model, so that its target weight information after embedded with the watermark information is indistinguishable from the reference weight information without watermark information. In the above-mentioned process of adversarial training, the detection neural network model and the target neural network model are cross-trained, and the training set of one neural network model will change as the training set of the other neural network model changes until the loss functions of the two neural network models converge.

In this embodiment, using the reference weight information and the target weight information as the training set to train the detection neural network model may specifically be:

sorting the reference weight information, and adding label information that is not embedded with the watermark information to the sorted reference weight information; sorting the target weight information, and adding label information that is embedded with the watermark information to the sorted target weight information; and sorting the weight information to strengthen the training effect of the detection neural network model, thereby improving the detection performance of the detection neural network model.

The sorted reference weight information and its label information is used as the first training sample, and the sorted target weight information and its label information is used as the second training sample. According to the first training sample and the second training sample, the detection neural network model is trained, and the weight information of the detection neural network model is updated according to the model loss function of the detection neural network model, so that the detection neural network model can distinguish between the reference weight information and the target weight information. Specifically, the weight information of the detection neural network model can be updated according to the following formula:

$$\hat{\theta} = \max_{\theta}(\log \text{Detector}(w^{unwm}; \theta) + \log(1 - \text{Detector}(w; \theta))) \quad (5)$$

The meaning of each parameter in the formula is:
Detector: the detection neural network model;
θ: the weight information of the detection neural network model;
w: the target weight information of the target neural network model;
$w^{unwm}$: the reference weight information of the reference neural network model.

Adjusting the model training method of the target neural network according to the distinguishability data of the reference weight information and the target weight information outputted by the detection neural network model may specifically be:

First, a regular term used for hiding watermark information according to the distinguishability data is obtained.

On the basis of a corresponding model loss function when a conventional training set is used to train the target neural network model and on the basis of a regular term used for embedding the watermark information, a regular term used for hiding the watermark information is added.

Based on the model loss function, the regular term used for embedding watermark information, and the regular term used for hiding watermark information, the weight information of the target neural network model is updated.

Specifically, the weight information of the target neural network model can be updated according to the following formula:

$$\hat{w} = \min_{w}\left(\text{loss}_o(w) + \text{loss}_R(w) - \lambda \log \underbrace{\text{Dectector}(w, \theta)}_{\text{loss}_{protect}}\right) \quad (6)$$

The meaning of each parameter in the formula is:
w: the target weight information of the target neural network model;
θ: the weight information of the detection neural network model;
$\text{loss}_R$: a regular term used for embedding the watermark, such as $\text{loss}_{embed}$ in the watermark information embedding process of the first embodiment;
$\text{loss}_{protect}$: the distinguishability data returned by the detection neural network.

The reference weight information and the target weight information is used as the training set to train the detection neural network model. According to the distinguishability data of the reference weight information and the target weight information outputted by the detection neural network model, the model training method of the target neural network is adjusted to obtain a target neural network model that satisfies the watermark information hiding condition. This process is an iterative update process. Both neural network models need to adjust the training method according to the training level of the other party, which may specifically be:

A1: Use the reference weight information and the first target weight information as a training set to train the detection neural network model; for example, train the detection neural network model by using the model training method provided above.

B1: Obtain first distinguishability data of the reference weight information and the first target weight information outputted by the detection neural network model.

C1: Determine the target neural network model corresponding to the first distinguishability data as satisfying the target neural network model that satisfies the watermark information hiding condition if the first distinguishability data indicates that the reference weight information is indistinguishable from the first target weight information.

D1: Provide the first distinguishability data to the target neural network model if the first degree of distinguishability data indicates that the reference weight information is distinguishable from the first target weight information, to allow the target neural network model to update the weight information according to the first distinguishability data and obtains second target weight information.

E1: Use the second target weight information and the reference weight information as a training set to train the detection neural network model, and obtain second distinguishability data of the second target weight information and the reference weight information outputted by the detection neural network model.

F1: Provide the second distinguishability data to the target neural network model if the second distinguishability data indicates that the reference weight information is distinguishable from the first target weight information, to allow the target neural network model to update the weight information according to the second distinguishable data and obtain third target weight information.

G1: By analogy, until target distinguishability data that satisfies the preset watermark information hiding condition is obtained, determine the target neural network model corresponding to the target distinguishability data as the target neural network model that satisfies the watermark information hiding condition.

Existing neural network model watermark embedding algorithms add a regular term in the model training process, so that watermark information can be learned into the weight information of the neural network. However, the regular term can easily change the weight distribution of the neural network model, making the watermark information in the neural network model to be detected relatively easily. In this case, even if the neural network model is further trained to restore the original weight distribution (such as adding an L2 regular term), machine learning models can detect the watermark information from the weight distribution. In order to resist watermark detectors based on machine learning technologies, this method simultaneously trains the detection neural network model in the process of embedding the watermark information in the target neural network model. Its function is to obtain a probability value of the watermark information included in the weight information of the target neural network model. This probability value is used as an additional penalty term (a regular term used for hiding watermark information) in the training process of the target neural network model, while the detection neural network model is alternately trained using the reference weight information of the pre-trained reference neural network model that does not include the watermark at the same time. Therefore, adversarial training is performed for the target neural network model and the detection neural network model. The detection neural network model hopes to accurately determine whether the input weight information is embedded with the watermark information, and the target neural network model hopes that the detection neural network model believes that its weight information does not include watermark information. According to the principle of generative adversarial networks, after the model converges, the detection neural network model cannot distinguish whether the weight information of the target neural network model is embedded with the watermark, and the detection neural network model will output 0.5 for the weight information of the input target neural network model. Therefore, the watermark information embedded in the weight information of the target neural network model cannot be detected by the deep learning model, which can achieve the purpose of hiding the watermark information.

Figure 3:
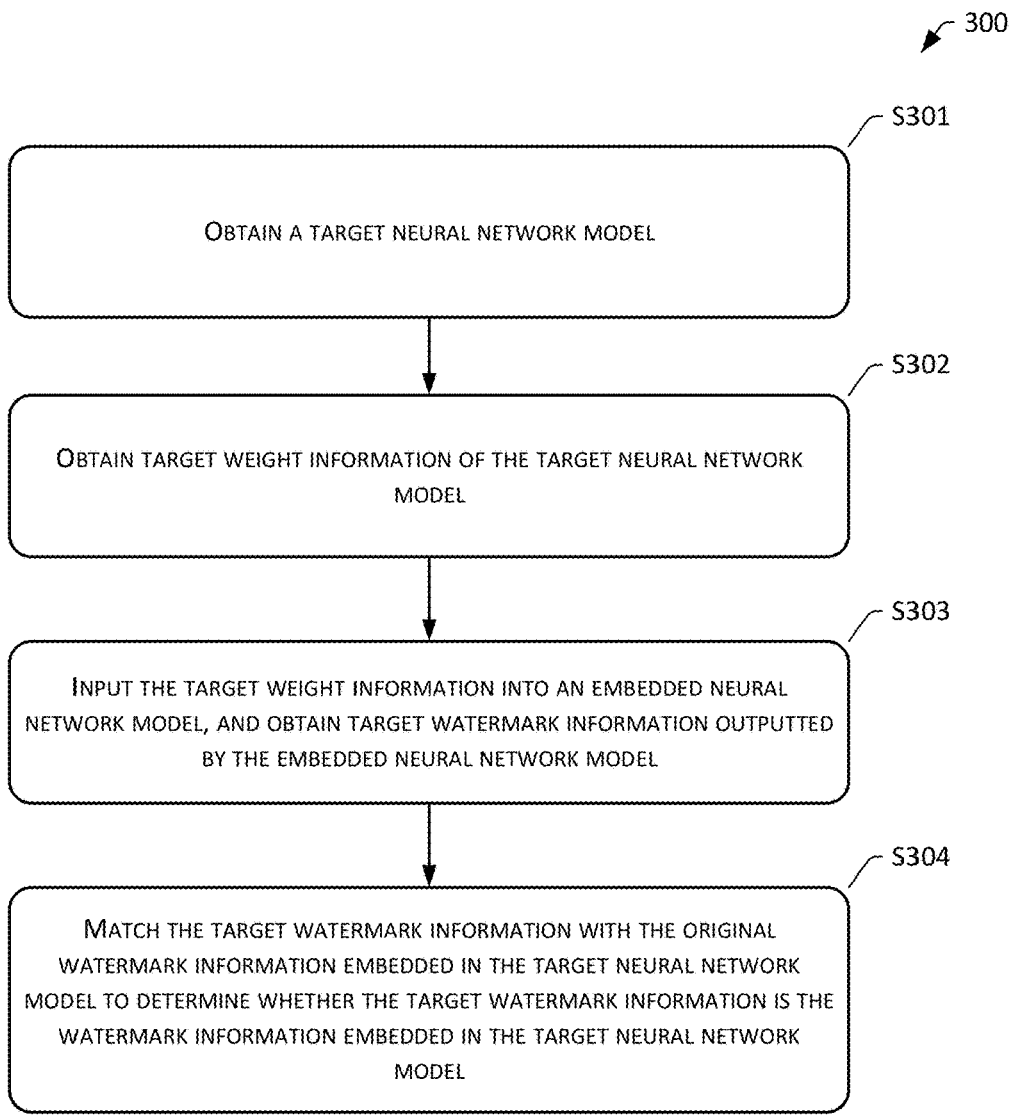
FIG. 3 is a flowchart of a method for extracting watermark information provided by a third embodiment of the present disclosure.

Corresponding to the above-mentioned first embodiment, a third embodiment of the present disclosure provides a method for extracting watermark information. As shown in FIG. 3, a method 300 for extracting watermark information provided by this embodiment includes the following steps:

S301: Obtain a target neural network model.

S302: Obtain target weight information of the target neural network model.

S303: Input the target weight information into an embedded neural network model, and obtain target watermark information outputted by the embedded neural network model, wherein the embedded neural network model is obtained by training based on weight information of the target neural network when watermark information is embedded and original watermark information embedded in the target neural network model, the embedded neural network model is used for obtaining the watermark information embedded in the target neural network model based on the weight information of the target neural network model. For relevant content of the embedded neural network model, reference can be made to the relevant description of the first embodiment of the present disclosure, which will not be repeated herein.

S304: Match the target watermark information with the original watermark information embedded in the target neural network model to determine whether the target watermark information is the watermark information embedded in the target neural network model.

Figure 4:
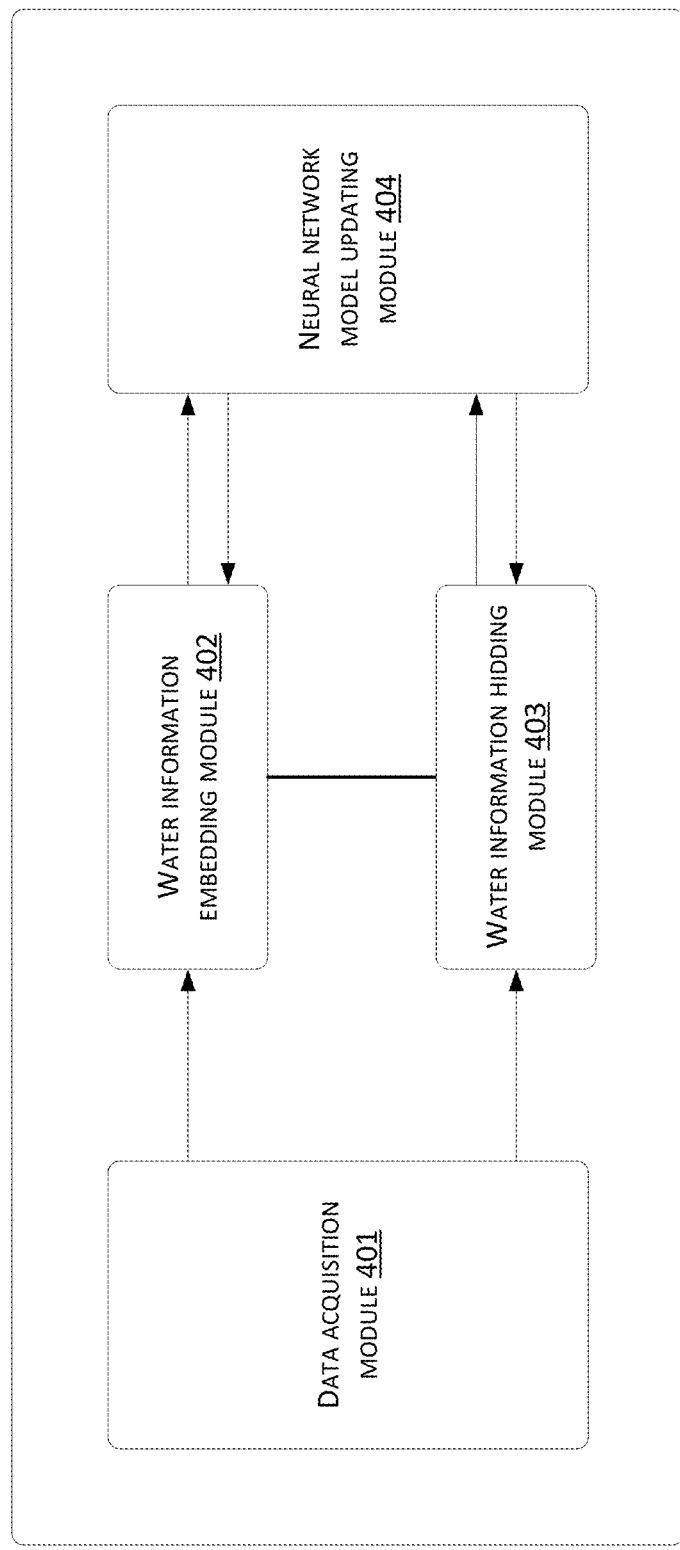
FIG. 4 is a schematic diagram of a watermark information embedding system provided by a fourth embodiment of the present disclosure.

A fourth embodiment of the present disclosure provides a watermark information embedding system, which combines the watermark information embedding method provided by the first embodiment of the present disclosure with the watermark information hiding method provided by the second embodiment of the present disclosure. As shown in FIG. 4, the system includes:

a data acquisition module 401, a watermark information embedding module 402, a watermark information hiding module 403, and a target neural network model updating module 404.

The data acquisition module 401 is configured to obtain original weight information of a target neural network model; obtain target watermark information; obtain reference weight information of a reference neural network; obtain random noise data; provide the target watermark information, the original weight information, the reference weight information and the noise data to the watermark information embedding module; and provide the reference weight information to the watermark information hiding module, the target neural network model and the reference neural network model having the same network structure.

The watermark information embedding module 402 is configured to obtain the original weight information of the target neural network model; obtain the target watermark information; obtain the reference weight information of the reference neural network; obtain random noise data; provide the target watermark information, the original weight information, the reference weight information and the noise data to the watermark information embedding module; and provide the reference weight information to the watermark information hiding module, the target neural network model and the reference neural network model having the same network structure.

The watermark information hiding module 403 is configured to use weight information embedded with watermark information and the reference weight information provided by the neural network model updating module as a hidden watermark training set to train a detection neural network model, and obtain distinguishability data of the weight information embedded with the watermark information and the reference weight information outputted by the neural network model; and provide the distinguishability data to the neural network model updating module.

The neural network model updating module 404 is configured to update the weight information of the target neural network model in a manner that enables the target neural network model to realize a predetermined function thereof, and based thereon, update the weight information of the target neural network model according to target watermark embedded data provided by the watermark information embedding module to obtain the weight information embedded with the watermark information; provide the weight information embedded with the watermark information to the watermark information hiding module; update the weight information of the target neural network model according to the distinguishability data provided by the watermark information hiding module to obtain a target neural network model embedded with the target watermark information and satisfying a watermark information hiding condition. As shown in the formula below, a loss function of the target neural network is:

$$\text{loss}_o(w) + \lambda_1 \text{loss}_{embed}(w) + \lambda_1 \text{loss}_{protect}$$

The above formula represents: according to its original training task (such as an image recognition task), while updating its weight information according to the model loss function ($\text{loss}_o$), the target neural network model updates its weight information according to a regular term ($\text{loss}_{embed}$) used for embedding the watermark information to embed the watermark information, and update its weight information according to a regular term ($\text{loss}_{protect}$) used for hiding the watermark information at the same time, so as to improve a degree of hiding of the embedded watermark information.

The first embodiment provides a watermark information embedding method. Correspondingly, a fifth embodiment of the present disclosure also provides a watermark information embedding apparatus. Since the apparatus embodiment is basically similar to the method embodiment, the description is relatively simple. For details of related technical features, reference can be made to corresponding descriptions of the method embodiments provided above. The following description of the apparatus embodiment is only illustrative.

Figure 5:
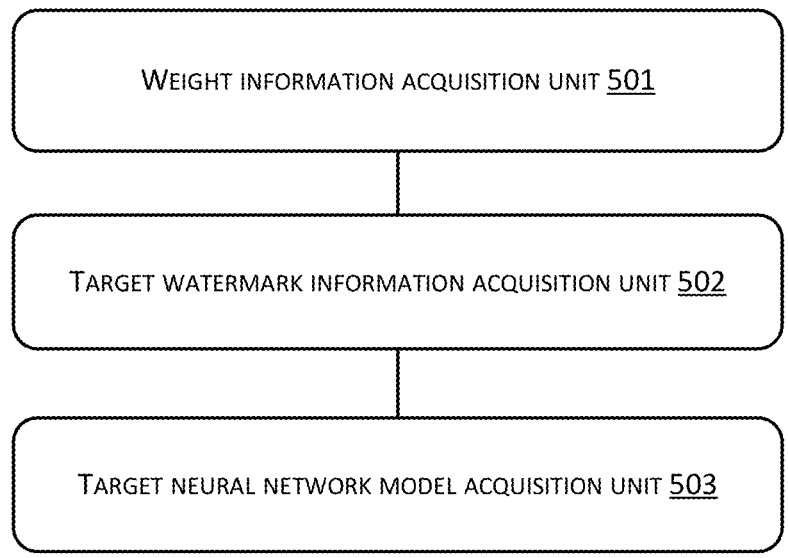
FIG. 5 is a unit block diagram of a watermark information embedding apparatus provided by a fifth embodiment of the present disclosure.

Referring to FIG. 5 to understand this embodiment, FIG. 5 is a unit block diagram of a watermark information embedding apparatus provided by this embodiment. As shown in FIG. 5, the apparatus provided by this embodiment includes:

a weight information acquisition unit 501 used for obtaining weight information of a target neural network model;

a target watermark information acquisition unit 502 used for obtaining target watermark information; and a target neural network model acquisition unit 503 used for training an embedded neural network model using the target watermark information and the weight information of the target neural network model, and update the weight information of the target neural network model according to embedding degree information provided by the embedded neural network model to obtain the embedded neural network model to obtain a target neural network model embedded with the target watermark information.

In embodiments, using the target watermark information and the weight information of the target neural network model to train the embedded neural network model includes:

obtaining weight information of a pre-trained reference neural network model that does not include the watermark information, the reference neural network model having the same structure as the target neural network model;

obtaining random noise information, the random noise information having the same structure as the target watermark information; and training the embedded neural network model according to the weight information of the reference neural network model, the random noise information, the weight information of the target neural network model and the target watermark information.

In embodiments, training the embedded neural network model according to the weight information of the reference neural network model, the random noise information, the weight information of the target neural network model and the target watermark information includes:

using the weight information of the target neural network model as an instance of a first watermark training set, using the target watermark information as a label of the first watermark training set, using the weight information of the reference neural network model as an instance of a second watermark training set, and using the random noise as a label of the second watermark training set; and using the first watermark training set and the second watermark training set as a training set, updating the weight information of the embedded neural network model according to a model loss function of the embedded neural network model until the model loss function converges.

In embodiments, while training the target neural network model, updating the weight information of the target neural network model according to the target watermark embedded data provided by the embedding neural network model to obtain the target neural network model embedded with the target watermark information includes:

inputting first weight information of the target neural network model into the embedded neural network model;

obtaining first target watermark embedded data outputted by the embedded neural network model, the target watermark embedded data including watermark information extracted by the embedding neural network model from the first weight information of the target neural network model;

if the first target watermark embedded data indicates that the target watermark information has been embedded in the first weight information, terminating training of the embedded neural network model, and determining the target neural network model corresponding to the first weight information as the target neural network model embedded with the target watermark information;

if the first target watermark embedded data indicates that the target watermark information is not completely embedded in the first weight information, training the embedding neural network model to obtain an embedded neural network model that completes the first training, and providing the first target watermark embedded data to the target neural network model;

updating the weight information of the target neural network model according to the first target watermark embedded data, and obtaining second weight information of the target neural network model;

inputting the second weight information of the target neural network model into the embedded neural network model that completes the first training; and by analogy, until a target neural network model that has completely embedded with the target watermark information and an embedded neural network model that is able to extract the target watermark information from the weight information of the target neural network model are obtained.

In embodiments, if the first target watermark embedded data indicates that the target watermark information is not completely embedded in the target neural network model, training the embedded neural network model to obtain the embedded neural network model that completes the first training includes:

using the first weight information of the target neural network model and the target watermark information as a watermark training set, updating the weight information of the embedded neural network model according to the watermark training set to obtain the embedded neural network model that completes the first training.

In embodiments, if the first target watermark embedded data indicates that the target watermark information is not completely embedded in the target neural network model, training the embedded neural network model to obtain the embedded neural network model that completes the first training includes:

obtaining random noise information, the random noise information having the same structure as the target watermark information;

obtaining first weight information of the reference neural network model, wherein the reference neural network and the target neural network have the same structure, and random noise information is not completely embedded in the first weight information of the reference neural network model;

using the first weight information of the reference neural network model, the random noise information, the first weight information of the target neural network model, and the target watermark information as a watermark training set, updating the weight information of the embedded neural network model according to the watermark training set to obtain the embedded neural network model that completes the first training.

In embodiments, updating the weight information of the target neural network model according to the target watermark embedded data provided by the embedded neural network model to obtain the target neural network model embedded with the target watermark information includes:

obtaining a regular term used for embedding watermark information according to the target watermark embedded data;

on a basis of a model loss function corresponding to training the target neural network model using a conventional training set, adding the regular term used for embedding the watermark information; and updating the weight information of the target neural network to obtain the target neural network model embedded with the target watermark information based on the model loss function and the regular term used for embedding the watermark information.

Figure 6:
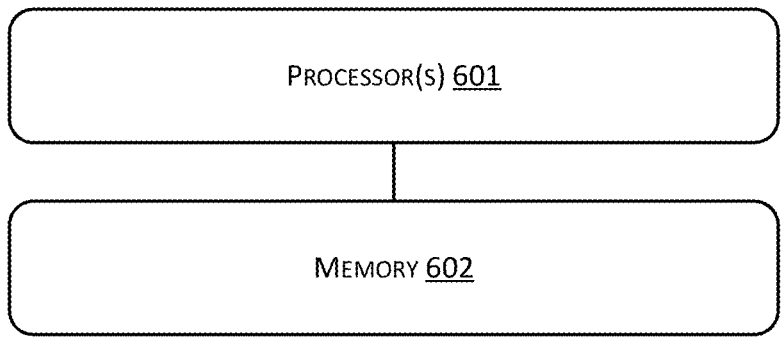
FIG. 6 is a schematic diagram of a logical structure of an electronic device provided by a sixth embodiment of the present disclosure.

In the foregoing embodiments, a watermark information embedding method and a watermark information embedding apparatus are provided. In addition, a sixth embodiment of the present disclosure also provides an electronic device. Since the electronic device embodiment is basically similar to the method embodiment, a description thereof is relatively simple. For details of related technical features, reference can be made to corresponding descriptions of the method embodiments provided above. The following description of the electronic device embodiment is only illustrative. An embodiment of the electronic device is as follows:

Referring to FIG. 6 to understand this embodiment, FIG. 6 is a schematic diagram of an electronic device provided in this embodiment.

As shown in FIG. 6, the electronic device includes: a processor 601 and a memory 602.

The memory 602 is configured to store a watermark information embedding program. When the program is read and executed by the processor, the following operations are performed:

obtaining weight information of a target neural network model;

obtaining target watermark information; and using the target watermark information and the weight information of the target neural network model to train an embedded neural network model, and updating the weight information of the target neural network model according to target watermark embedded data provided by the embedded neural network model to obtain a target neural network model embedded with the target watermark information, wherein the embedded neural network model is used for obtaining the target watermark embedded data according to the weight information of the target neural network model, and the target watermark embedded data is used for representing an embedding degree of watermark information embedded in the target neural network model.

In embodiments, using the target watermark information and the weight information of the target neural network model to train the embedded neural network model includes:

obtaining weight information of a pre-trained reference neural network model that does not include watermark information, the reference neural network model having the same structure as the target neural network model;

obtaining random noise information, the random noise information having the same structure as the target watermark information; and training the embedded neural network model according to the weight information of the reference neural network model, the random noise information, the weight information of the target neural network model and the target watermark information.

In embodiments, training the embedded neural network model according to the weight information of the reference neural network model, the random noise information, the weight information of the target neural network model and the target watermark information includes:

using the weight information of the target neural network model as an instance of a first watermark training set, using the target watermark information as a label of the first watermark training set, using the weight information of the reference neural network model as an instance of a second watermark training set, and using the random noise information as a label of the second watermark training set; and using the first watermark training set and the second watermark training set as a training set, updating the weight information of the embedded neural network model according to a model loss function of the embedded neural network model until the model loss function converges.

In embodiments, while training the target neural network model, updating the weight information of the target neural network model according to the target watermark embedded data provided by the embedding neural network model to obtain the target neural network model embedded with the target watermark information includes:

inputting first weight information of the target neural network model into the embedded neural network model;

obtaining first target watermark embedded data outputted by the embedded neural network model, the target watermark embedded data including watermark information extracted by the embedded neural network model from the first weight information of the target neural network model;

if the first target watermark embedded data indicates that the target watermark information has been embedded in the first weight information, terminating training of the embedded neural network model, and determining a target neural network model corresponding to the first weight information as the target neural network model embedded with the target watermark information;

If the first target watermark embedded data indicates that the target watermark information is not completely embedded in the first weight information, training the embedded neural network model to obtain an embedded neural network model that completes first training, and providing the first target watermark embedded data to the target neural network model;

updating the weight information of the target neural network model according to the first target watermark embedded data, and obtaining second weight information of the target neural network model;

inputting the second weight information of the target neural network model into the embedded neural network model that completes the first training;

by analogy, until a target neural network model that has completely embedded with the target watermark information and an embedded neural network model that is able to extract the target watermark information from the weight information of the target neural network model are obtained.

In embodiments, if the first target watermark embedded data indicates that the target watermark information is not completely embedded in the target neural network model, training the embedded neural network model to obtain the embedded neural network model that completes the first training includes:

using the first weight information of the target neural network model and the target watermark information as a watermark training set, updating the weight information of the embedded neural network model according to the watermark training set to obtain the embedded neural network model that completes the first training.

In embodiments, if the first target watermark embedded data indicates that the target watermark information is not completely embedded in the target neural network model, training the embedded neural network model to obtain the embedded neural network model that completes the first training includes:

obtaining random noise information, the random noise information having the same structure as the target watermark information;

obtaining first weight information of the reference neural network model, wherein the reference neural network and the target neural network have the same structure, and random noise information is not completely embedded in the first weight information of the reference neural network model;

using the first weight information of the reference neural network model, the random noise information, the first weight information of the target neural network model, and the target watermark information as a watermark training set, updating the weight information of the embedded neural network model according to the watermark training set to obtain the embedded neural network model that completes the first training.

In embodiments, updating the weight information of the target neural network model according to the target watermark embedded data provided by the embedded neural network model to obtain the target neural network model embedded with the target watermark information includes:

obtaining a regular term used for embedding watermark information according to the target watermark embedded data;

on a basis of a model loss function corresponding to training the target neural network model using a conventional training set, adding the regular term used for embedding the watermark information; and updating the weight information of the target neural network to obtain the target neural network model embedded with the target watermark information based on the model loss function and the regular term used for embedding the watermark information.

The second embodiment provides a watermark information hiding method. Correspondingly, a seventh embodiment of the present disclosure also provides a watermark information hiding apparatus. Since the apparatus embodiment is basically similar to the method embodiment, a description thereof is relatively simple. For details of related technical features, reference can be made to corresponding descriptions of the method embodiments provided above. The following description of the apparatus embodiment is only illustrative.

Figure 7:
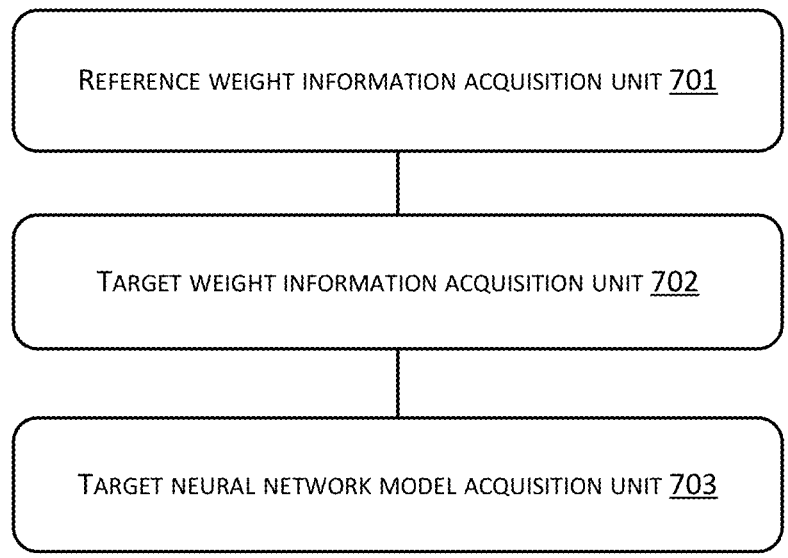
FIG. 7 is a unit block diagram of a watermark information hiding apparatus provided by a seventh embodiment of the present disclosure.

Referring to FIG. 7 to understand this embodiment, FIG. 7 is a unit block diagram of the apparatus provided by this embodiment. As shown in FIG. 7, the watermark information hiding apparatus provided by this embodiment includes:

a reference weight information acquisition unit 701 configured to obtain reference weight information of a reference neural network model that is not embedded with watermark information;

a target weight information acquisition unit 702 configured to obtain target weight information of a target neural network model embedded with a part of the watermark information, the reference neural network model and the target neural network model having the same structure; and a target neural network model acquisition unit 703 configured to use the reference weight information and the target weight information as a training set to train a detection neural network model, and adjust a model training method of the target neural network model according to distinguishability data of the reference weight information and the target weight information outputted by the detection neural network model to obtain a target neural network model that satisfies a watermark information hiding condition.

In embodiments, using the reference weight information and the target weight information as the training set to train the detection neural network model, and adjusting the model training method of the target neural network according to the distinguishability data of the reference weight information and the target weight information outputted by the detection neural network model method to obtain the target neural network model that satisfies the watermark information hiding condition, includes:

using the reference weight information and the first target weight information as the training set to train the detection neural network model;

obtaining first distinguishability data of the reference weight information and the first target weight information outputted by the detection neural network model;

if the first distinguishability data indicates that the reference weight information is indistinguishable from the first target weight information, determining that a target neural network model corresponding to the first distinguishability data is the target neural network model that satisfies the watermark information hiding condition;

If the first distinguishability data indicates that the reference weight information is distinguishable from the first target weight information, providing the first distinguishability data to the target neural network model for the target neural network model to update the weight information according to the first distinguishability data information to obtain second target weight information;

using the reference weight information and the second target weight information as the training set to train the detection neural network model;

by analogy, until target distinguishability data satisfying a preset watermark information hiding condition is obtained, and a target neural network model corresponding to the target distinguishability data is determined as the target neural network model that satisfies the watermark information hiding condition.

In embodiments, using the reference weight information and the target weight information as the training set to train the detection neural network model includes:

sorting the reference weight information, and adding label information that is not embedded with watermark information to the sorted reference weight information;

sorting the target weight information, and adding label information embedded with watermark information to the sorted target weight information; and using the sorted reference weight information and the label information thereof as a first training sample, using the sorted target weight information and the label information thereof as a second training sample, and training the detection neural network model according to the first training sample and the second training sample, to enable the detection neural network model to distinguish between the reference weight information and the target weight information.

In embodiments, using the reference weight information and the target weight information as the training set to train the detection neural network model includes: using the reference weight information and the target weight information as the training set, and updating the weight information of the detection neural network model according to a model loss function of the detection neural network model.

In embodiments, adjusting the model training method of the target neural network according to the distinguishability data of the reference weight information and the target weight information outputted by the detection neural network model includes:

obtaining a regular term used for hiding the watermark information according to the distinguishability data;

on a basis of a model loss function corresponding to training of the target neural network model using a conventional training set, and on a basis of a regular term used for embedding the watermark information, adding the regular term used for hiding the watermark information to obtain a target loss function corresponding to the target neural network model; and updating the weight information of the target neural network model based on the target loss function.

Figure 8:
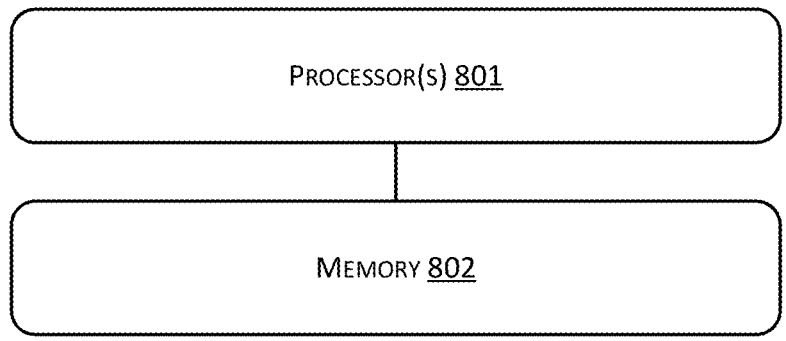
FIG. 8 is a schematic diagram of a logical structure of an electronic device provided by an eighth embodiment of the present disclosure.

In the foregoing embodiments, a watermark information hiding method and a watermark information hiding apparatus are provided. In addition, an eighth embodiment of the present disclosure also provides an electronic device. Since the electronic device embodiment is basically similar to the method embodiment, a description thereof is relatively simple. For details of related technical features, reference can be made to corresponding descriptions of the method embodiments provided above. The following description of the electronic device embodiment is only illustrative. An example of the electronic device is as follows:

Referring to FIG. 8 to understand this embodiment, FIG. 8 is a schematic diagram of an electronic device provided in this embodiment.

As shown in FIG. 8, the electronic device includes: a processor 801 and a memory 802.

The memory 802 is configured to store a watermark information hiding program. When the program is read and executed by the processor, the following operations are performed:

obtaining reference weight information of a reference neural network model that is not embedded with watermark information;

obtaining target weight information of a target neural network model embedded with a part of the watermark information, the reference neural network model having the same structure as the target neural network model;

using the reference weight information and the target weight information as a training set to train a detection neural network model, and adjusting a model training method of the target neural network model according to distinguishability data of the reference weight information and the target weight information outputted by the detection neural network model to obtain a target neural network model that satisfies a watermark information hiding condition.

In embodiments, using the reference weight information and the target weight information as the training set to train the detection neural network model, and adjusting the model training method of the target neural network according to the distinguishability data of the reference weight information and the target weight information outputted by the detection neural network model method to obtain the target neural network model that satisfies the watermark information hiding condition, includes:

using the reference weight information and the first target weight information as the training set to train the detection neural network model;

obtaining first distinguishability data of the reference weight information and the first target weight information outputted by the detection neural network model;

if the first distinguishability data indicates that the reference weight information is indistinguishable from the first target weight information, determining that a target neural network model corresponding to the first distinguishability data is the target neural network model that satisfies the watermark information hiding condition;

If the first distinguishability data indicates that the reference weight information is distinguishable from the first target weight information, providing the first distinguishability data to the target neural network model for the target neural network model to update the weight information according to the first distinguishability data information to obtain second target weight information;

using the reference weight information and the second target weight information as the training set to train the detection neural network model;

by analogy, until target distinguishability data satisfying a preset watermark information hiding condition is obtained, and a target neural network model corresponding to the target distinguishability data is determined as the target neural network model that satisfies the watermark information hiding condition.

In embodiments, using the reference weight information and the target weight information as the training set to train the detection neural network model includes:

sorting the reference weight information, and adding label information that is not embedded with watermark information to the sorted reference weight information;

sorting the target weight information, and adding label information embedded with watermark information to the sorted target weight information; and using the sorted reference weight information and the label information thereof as a first training sample, using the sorted target weight information and the label information thereof as a second training sample, and training the detection neural network model according to the first training sample and the second training sample, to enable the detection neural network model to distinguish between the reference weight information and the target weight information.

In embodiments, using the reference weight information and the target weight information as the training set to train the detection neural network model includes: using the reference weight information and the target weight information as the training set, and updating the weight information of the detection neural network model according to a model loss function of the detection neural network model.

In embodiments, adjusting the model training method of the target neural network according to the distinguishability data of the reference weight information and the target weight information outputted by the detection neural network model includes:

obtaining a regular term used for hiding the watermark information according to the distinguishability data;

on a basis of a model loss function corresponding to training of the target neural network model using a conventional training set, and on a basis of a regular term used for embedding the watermark information, adding the regular term used for hiding the watermark information to obtain a target loss function corresponding to the target neural network model; and updating the weight information of the target neural network model based on the target loss function.

The third embodiment provides a method for extracting watermark information. Correspondingly, a ninth embodiment of the present disclosure also provides an apparatus for extracting watermark information. Since the apparatus embodiment is basically similar to the method embodiment, a description thereof is relatively simple. For details of the related technical features, reference can be made to corresponding descriptions of the method embodiments provided above. The following description of the apparatus embodiment is only illustrative.

Figure 9:
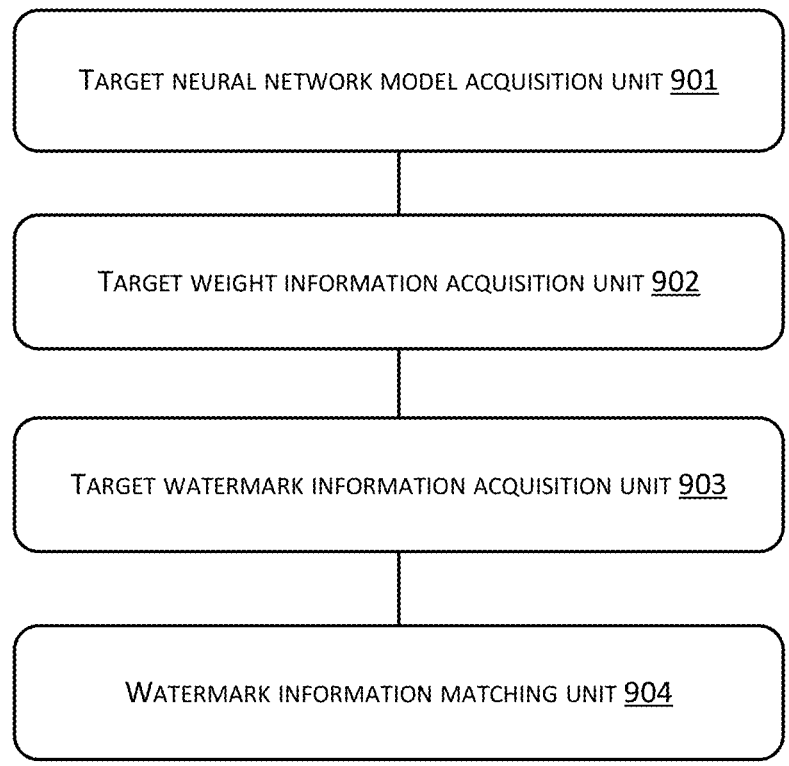
FIG. 9 is a unit block diagram of a watermark information extraction apparatus provided by the ninth embodiment of the present disclosure.

Referring to FIG. 9 to understand this embodiment, FIG. 9 is a unit block diagram of an apparatus provided by this embodiment. As shown in FIG. 9, the apparatus provided by this embodiment includes:

a target neural network model acquisition unit 901 configured to obtain a target neural network model;

a target weight information acquisition unit 902 configured to obtain target weight information of the target neural network model;

a target watermark information acquisition unit 903 configured to input the target weight information into an embedded neural network model to obtain the target watermark information outputted by the embedded neural network model, wherein the embedded neural network model is obtained by training according to weight information of the target neural network model when the watermark information is embedded and original watermark information embedded in the target neural network model, and the embedded neural network model is used for obtaining the watermark information embedded in the target neural network model according to the weight information of the target neural network model;

a watermark information matching unit 904 configured to match the target watermark information with the original watermark information embedded in the target neural network model, and determine whether the target watermark information is the watermark information embedded in the target neural network model.

Figure 10:
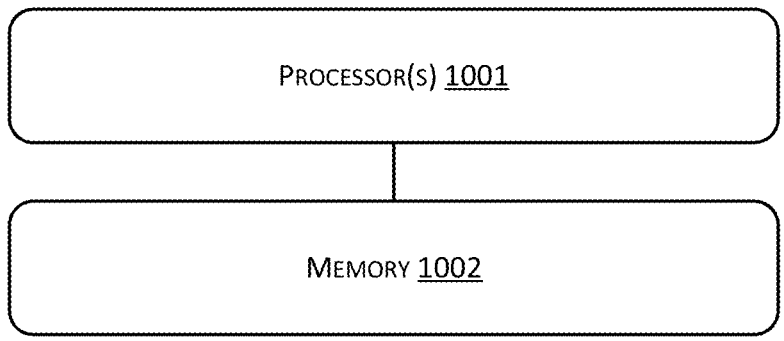
FIG. 10 is a schematic diagram of a logical structure of an electronic device provided in a tenth embodiment of the present disclosure.

In the foregoing embodiments, a watermark information extraction method and a watermark information extraction apparatus are provided. In addition, a tenth embodiment of the present disclosure also provides an electronic device. Since the electronic device embodiment is basically similar to the method embodiment, a description thereof is relatively simple. For details of related technical features, reference can be made to corresponding descriptions of the method embodiments provided above. The following description of the electronic device embodiment is only illustrative. An example of the electronic device is as follows:

Referring to FIG. 10 to understand this embodiment, FIG. 10 is a schematic diagram of an electronic device provided in this embodiment.

As shown in FIG. 10, the electronic device includes: a processor 1001 and a memory 1002.

The memory 1002 is configured to store a watermark information extraction program. When the program is read and executed by the processor, the following operations are performed:

obtaining a target neural network model; obtaining target weight information of the target neural network model; inputting the target weight information into an embedded neural network model to obtain the target watermark information outputted by the embedded neural network model, wherein the embedded neural network model is obtained by training according to weight information of the target neural network model when the watermark information is embedded and original watermark information embedded in the target neural network model, and the embedded neural network model is used for obtaining the watermark information embedded in the target neural network model according to the weight information of the target neural network model; matching the target watermark information with the original watermark information embedded in the target neural network model, and determining whether the target watermark information is the watermark information embedded in the target neural network model.

In embodiments, an apparatus (such as the apparatuses as shown in FIGS. 5, 7, and 9), a system (such as the system as shown in FIG. 4), and a computing device (such as the electronic devices as shown in FIGS. 6, 8, and 10) may each include one or more processors (CPUs), an input/output interface, a network interface, and a memory.

The memory may include a form of computer readable media such as a volatile memory, a random access memory (RAM) and/or a non-volatile memory, for example, a read-only memory (ROM) or a flash RAM. The memory is an example of a computer readable media.

1. The computer readable media may include a volatile or non-volatile type, a removable or non-removable media, which may achieve storage of information using any method or technology. The information may include a computer readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

2. One skilled in the art should understand that the embodiments of the present disclosure may be provided as methods, systems or computer program products. Accordingly, the present disclosure may take a form of an entirely hardware embodiment, an entirely software embodiment, or an embodiment of a combination of software and hardware aspects. Furthermore, the present disclosure may take a form of a computer program product embodied on one or more computer-usable storage media (which include, but are not limited to, a magnetic storage, CD-ROM, an optical storage, etc.) having computer-usable program codes.

Although the present disclosure is disclosed above with preferred embodiments, they are not intended to limit the present disclosure. One skilled in the art can make possible changes and modifications without departing from the spirit and scope of the present disclosure. Therefore, the scope of protection of the present disclosure shall be subject to the scope defined by the claims of the present disclosure.

The present disclosure can be further understood using the following clauses.

Clause 1: A method for embedding watermark information, comprising: obtaining weight information of a target neural network model; obtaining target watermark information; and using the target watermark information and the weight information of the target neural network model to train an embedded neural network model, and updating the weight information of the target neural network model according to target watermark embedded data provided by the embedded neural network model to obtain the target neural network model embedded with the target watermark information, wherein the embedded neural network model is used for obtaining the target watermark embedded data according to the weight information of the target neural network model, and the target watermark embedded data is used for representing an embedding degree of embedded watermark information in the target neural network model.

Clause 2: The method according to Clause 1, wherein using the target watermark information and the weight information of the target neural network model to train the embedded neural network model comprises: obtaining weight information of a pre-trained reference neural network model without the watermark information embedded, the reference neural network model and the target neural network having a same structure; obtaining random noise information, the random noise information and the target watermark information having a same structure; and training the embedded neural network model according to the weight information of the reference neural network model, the random noise information, the weight information of the target neural network model and the target watermark information.

Clause 3: The method according to Clause 2, wherein training the embedded neural network model according to the weight information of the reference neural network model, the random noise information, the weight information of the target neural network model, and the target watermark information comprises: using the weight information of the target neural network model as an instance of a first watermark training set, using the target watermark information as a label of the first watermark training set, and using the weight information of the reference neural network model as an instance of a second watermark training set, and using the random noise information as a label of the second watermark training set; and using the first watermark training set and the second watermark training set as a training set, updating the weight information of the embedded neural network model according to a model loss function of the embedded neural network model until the model loss function converges.

Clause 4: The method according to Clause 1, wherein updating the weight information of the target neural network model according to the target watermark embedded data provided by the embedded neural network model to obtain the target neural network model embedded with the target watermark information comprises: inputting first weight information of the target neural network model into the embedded neural network model; obtaining first target watermark embedded data outputted by the embedded neural network model, the target watermark embedded data including watermark information extracted from the first weight information of the target neural network model by the embedded neural network model; terminating the training of the embedded neural network model if the first target watermark embedded data indicates that the target watermark information has been embedded in the first weight information, and determining that a target neural network model corresponding to the first weight information as the target neural network model embedded with the target watermark information; training the embedded neural network model if the first target watermark embedded data indicates that the target watermark information is not completely embedded in the first weight information to obtain an embedded neural network model that completes a first training, and providing the first target watermark embedded data to the target neural network model; updating the weight information of the target neural network model according to the first target watermark embedded data to obtain second weight information of the target neural network model; inputting the second weight information of the target neural network model to the embedded neural network model that completes the first training; and by analogy, until the target neural network model that is completely embedded with the target watermark information and the target watermark information of the embedded neural network model that is able to be extracted from the weight information of the target neural network model are obtained.

Clause 5: The method according to Clause 4, wherein training the embedded neural network model to obtain the embedded neural network model that completes the first training if the first target watermark embedded data indicates that the target watermark information is not completely embedded in the target neural network model, comprises: using the first weight information of the target neural network model and the target watermark information as a watermark training set, updating the weight information of the embedded neural network model according to the watermark training set to obtain the embedded neural network model that completes the first training.

Clause 6: The method according to Clause 4, wherein training the embedded neural network model to obtain the embedded neural network model that completes the first training if the first target watermark embedded data indicates that the target watermark information is not completely embedded in the target neural network model, comprises: obtaining random noise information, the random noise information having a same structure as the target watermark information; obtaining first weight information of a reference neural network model, the reference neural network and the target neural network having a same structure, wherein the random noise information is not completely embedded in the first weight information of the reference neural network model; and using the first weight information of the reference neural network model, the random noise information, the first weight information of the target neural network model, and the target watermark information as a watermark training set, and updating the weight information of the embedded neural network model according to the watermark training set to obtain the embedded neural network model that completes the first training.

Clause 7: The method according to Clause 1, wherein updating the weight information of the target neural network model according to the target watermark embedded data provided by the embedded neural network model to obtain the target neural network model embedded with the target watermark information comprises: obtaining a regular term for embedding the watermark information according to the target watermark embedded data; adding the regular term for embedding the watermark information on a basis of a corresponding model loss function when the target neural network model is trained using a conventional training set; and updating the weight information of the target neural network based on the model loss function and the regular term for embedding the watermark information, and obtaining the target neural network model embedded with the target watermark information.

Clause 8: A watermark information hiding method, comprising: obtaining reference weight information of a reference neural network model that is not embedded with watermark information; obtaining target weight information of a target neural network model that is embedded with partial watermark information, the reference neural network model and the target neural network model having a same structure; and using the reference weight information and the target weight information as a training set to train a detection neural network model, and adjusting a model training method of the target neural network model according to distinguishability data of the reference weight information and the target weight information outputted by the detection neural network model, and obtaining a target neural network model that satisfies a watermark information hiding condition.

Clause 9: The method according to Clause 8, wherein using the reference weight information and the target weight information as the training set to train the detection neural network model, and adjusting the model training method of the target neural network model according to the distinguishability data of the reference weight information and the target weight information outputted by the detection neural network model to obtain the target neural network model that satisfies the watermark information hiding condition, comprise: using the reference weight information and the first target weight information as the training set to train the detection neural network model; obtaining first distinguishability data of the reference weight information and the first target weight information outputted by the detection neural network model; determining a target neural network model corresponding to the first distinguishability data as the target neural network model that satisfies the watermark information hiding condition if the first distinguishability data indicates that the reference weight information and first target weight information is indistinguishable; providing the first distinguishability data to the target neural network model to allow the target neural network model to update the weight information according to the first distinguishability data and obtain second target weight information if the first distinguishability data indicates that the reference weight information is distinguishable from the first target weight information; using the reference weight information and the second target weight information as the training set to train the detection neural network model; and by analogy, until target distinguishability data satisfying a preset watermark information hiding condition is obtained, and a target neural network model corresponding to the target distinguishability data is determined as the target neural network model that satisfies the watermark information hiding condition.

Clause 10: The method according to Clause 8, wherein using the reference weight information and the target weight information as the training set to train the detection neural network model comprises: sorting the reference weight information, and adding label information that is not embedded with watermark information to the sorted reference weight information; sorting the target weight information, and add label information that is embedded with watermark information to the sorted target weight information; and using the sorted reference weight information and the label information thereof as a first training sample, using the sorted target weight information and the label information thereof as a second training sample, training the detection neural network model according to the first training sample and the second training sample, to enable the detection neural network model to be able to distinguish between the reference weight information and the target weight information.

Clause 11: The method according to Clause 8, wherein using the reference weight information and the target weight information as the training set to train the detection neural network model comprises: using the reference weight information and the target weight information as the training set, and updating the weight information of the detection neural network model according to a model loss function of the detection neural network model.

Clause 12: The method according to Clause 8, wherein adjusting the model training method of the target neural network model according to the distinguishability data of the reference weight information and the target weight information outputted by the detection neural network model comprises: obtaining a regular term used for hiding the watermark information according to the distinguishability information; adding the regular term used for hiding the watermark information on a basis of a corresponding model loss function when a conventional training set is used to train the target neural network model and a regular term used for embedding the watermark information, and obtaining a target loss function corresponding to the target neural network model; and updating the weight information of the target neural network model based on the target loss function.

Clause 13: A method for extracting watermark information, comprising: obtaining a target neural network model; obtaining target weight information of the target neural network model; inputting the target weight information into an embedded neural network model to obtain target watermark information outputted by the embedded neural network model, wherein the embedded neural network model is obtained by training according to weight information of the target neural network model when the watermark information is embedded and original watermark information embedded in the target neural network model, and the embedded neural network model is used for obtaining the watermark information embedded in the target neural network model according to the weight information of the target neural network model; and matching the target watermark information with the original watermark information embedded in the target neural network model, and determining whether the target watermark information is the watermark information embedded in the target neural network model.

Clause 14: An apparatus for embedding watermark information, comprising: a weight information acquisition unit used for obtaining weight information of a target neural network model; a target watermark information acquisition unit used for obtaining target watermark information; an embedded neural network model training unit used for using the target watermark information and the weight information of the target neural network model to train an embedded neural network model, and updating the weight information of the target neural network model according to embedding degree information provided by the embedded neural network model to obtain a target neural network model embedded with the target watermark information.

Clause 15: An electronic device comprising: a processor; and a memory being used for storing a watermark information embedding program, and the program, when being read and executed by the processor, performing the following operations: obtaining weight information of a target neural network model; obtaining target watermark information; and using the target watermark information and the weight information of the target neural network model to train an embedded neural network model, and updating the weight information of the target neural network model according to target watermark embedded data provided by the embedded neural network model to obtain a target neural network model embedded with the target watermark information, wherein the embedded neural network model is used for obtaining the target watermark embedded data according to the weight information of the target neural network model, and the target watermark embedded data is used for representing an embedding degree of embedded watermark information in the target neural network model.

Clause 16: A watermark information hiding apparatus, comprising: a reference weight information acquisition unit used for obtaining reference weight information of a reference neural network model that is not embedded with watermark information; a target weight information acquisition unit used for obtaining target weight information of a target neural network model that is embedded with partial watermark information, the reference neural network model and the target neural network model having a same structure; and a target neural network model acquisition unit used for using the reference weight information and the target weight information as a training set to train a detection neural network model, and adjusting a model training method of the target neural network model according to distinguishability data of the reference weight information and the target weight information outputted by the detection neural network model, and obtaining a target neural network model that satisfies a watermark information hiding condition.

Clause 17: An electronic device comprising: a processor; and a memory being used for storing a watermark information hiding program, and the program when being read and executed by the processor, performing the following operations: obtaining reference weight information of a reference neural network model that is not embedded with watermark information; obtaining target weight information of a target neural network model that is embedded with partial watermark information, the reference neural network model and the target neural network model having a same structure; and using the reference weight information and the target weight information as a training set to train a detection neural network model, and adjusting a model training method of the target neural network model according to distinguishability data of the reference weight information and the target weight information outputted by the detection neural network model, and obtaining a target neural network model that satisfies a watermark information hiding condition.

Clause 18: An apparatus for extracting watermark information, comprising: a target neural network model acquisition unit used for obtaining a target neural network model; a target weight information acquisition unit used for obtaining target weight information of the target neural network model; a target watermark information acquisition unit used for inputting the target weight information into an embedded neural network model to obtain target watermark information outputted by the embedded neural network model, wherein the embedded neural network model is obtained by training according to weight information of the target neural network model when the watermark information is embedded and original watermark information embedded in the target neural network model, and the embedded neural network model is used for obtaining the watermark information embedded in the target neural network model according to the weight information of the target neural network model; and a watermark information matching unit used for matching the target watermark information with the original watermark information embedded in the target neural network model, and determining whether the target watermark information is the watermark information embedded in the target neural network model.

Clause 19: An electronic device comprising: a processor; and a memory being used for storing a watermark information extraction program for a neural network, and the program, when being read and executed by the processor, performing the following operations: obtaining a target neural network model; obtaining target weight information of the target neural network model; inputting the target weight information into an embedded neural network model to obtain target watermark information outputted by the embedded neural network model, wherein the embedded neural network model is obtained by training according to weight information of the target neural network model when the watermark information is embedded and original watermark information embedded in the target neural network model; the embedded neural network model is used for obtaining the watermark information embedded in the target neural network model according to the weight information of the target neural network model; and matching the target watermark information with the original watermark information embedded in the target neural network model, and determining whether the target watermark information is the watermark information embedded in the target neural network model.

Clause 20: A watermark information embedding system, comprising: a data acquisition module, a watermark information embedding module, a watermark information hiding module, and a target neural network model updating module; the data acquisition module being used for obtaining original weight information of a target neural network model; obtaining target watermark information; obtaining reference weight information of a reference neural network model; obtaining random noise data; providing the reference weight information and the noise data to the watermark information embedding module; and providing the reference weight information to the watermark information hiding module, the target neural network model and the reference neural network model having a same network structure; the watermark information embedding module being used for training an embedded neural network model using the target watermark information, the original weight information, the reference weight information and the noise data as an embedded watermark training set, and obtaining the target watermark embedded data outputted by the embedded neural network model, the target watermark embedded data being used to represent an embedding degree of embedded watermark information in the target neural network model; and providing the target watermark embedded data to the neural network model updating module; the watermark information hiding module being used for training a detection neural network model using the weight information embedded with watermark information and the reference weight information provided by the neural network model updating module as a hidden watermark training set, and obtaining distinguishability data of the weight information embedded with the watermark information and the reference weight information outputted by the detection neural network model; and providing the distinguishability data to the neural network model updating module; and the neural network model updating module being used for updating the weight information of the target neural network model in a manner that enables the target neural network model to achieve predetermined functions thereof, updating the weight information of the target neural network model on a basis thereof according to target watermark embedded data provided by the watermark information embedding module, and obtaining the weight information embedded with the watermark information; providing the weight information embedded with the watermark information to the watermark information hiding module; and updating the weight information of the target neural network model according to the distinguishability data provided by the watermark information hiding module, and obtaining a target neural network model embedded with the target watermark information and satisfying a watermark information hiding condition.

What is claimed is:

1. A method implemented by a computing device, the method comprising:
   obtaining weight information of a target neural network model;
   obtaining target watermark information; and
   using the target watermark information and the weight information of the target neural network model to train an embedded neural network model, and updating the weight information of the target neural network model according to target watermark embedded data provided by the embedded neural network model to obtain the target neural network model embedded with the target watermark information, wherein using the target watermark information and the weight information of the target neural network model to train the embedded neural network model comprises:
      obtaining random noise information;
      using the weight information of the target neural network model as an instance of a first watermark training set, and using the target watermark information as a label of the first watermark training set;
      using weight information of a reference neural network model as an instance of a second watermark training set, and using the random noise information as a label of the second watermark training set, the reference neural network model being a neural network model without the target watermark information embedded; and
      using the first watermark training set and the second watermark training set as a new training set, and updating the weight information of the embedded neural network model according to a model loss function of the embedded neural network model until the model loss function converges.

2. The method according to claim 1, wherein using the target watermark information and the weight information of the target neural network model to train the embedded neural network model comprises:
   obtaining the weight information of the reference neural network model, the reference neural network model being a pre-trained model without the watermark information embedded, and the reference neural network model and the target neural network model having a same structure; and
   training the embedded neural network model according to the weight information of the reference neural network model, the random noise information, the weight information of the target neural network model and the target watermark information, wherein the random noise information and the target watermark information having a same structure.

3. The method according to claim 1, wherein updating the weight information of the target neural network model according to the target watermark embedded data provided by the embedded neural network model to obtain the target neural network model embedded with the target watermark information comprises:
   inputting first weight information of the target neural network model into the embedded neural network model;
   obtaining first target watermark embedded data outputted by the embedded neural network model, the first target watermark embedded data including watermark information extracted from the first weight information of the target neural network model by the embedded neural network model;
   terminating the training of the embedded neural network model if the first target watermark embedded data indicates that the target watermark information has been embedded in the first weight information, and determining that a target neural network model corresponding to the first weight information as the target neural network model embedded with the target watermark information.

4. The method according to claim 1, wherein updating the weight information of the target neural network model according to the target watermark embedded data provided by the embedded neural network model to obtain the target neural network model embedded with the target watermark information comprises:
   inputting first weight information of the target neural network model into the embedded neural network model;
   obtaining first target watermark embedded data outputted by the embedded neural network model, the first target watermark embedded data including watermark information extracted from the first weight information of the target neural network model by the embedded neural network model;
   training the embedded neural network model if the first target watermark embedded data indicates that the target watermark information is not completely embedded in the first weight information to obtain an embedded neural network model that completes a first training, and providing the first target watermark embedded data to the target neural network model;

updating the weight information of the target neural network model according to the first target watermark embedded data to obtain second weight information of the target neural network model;

repeating the inputting, the obtaining and the training using the second weight information as the first weight information until the target neural network model that is completely embedded with the target watermark information and the target watermark information of the embedded neural network model that is able to be extracted from the weight information of the target neural network model are obtained.

5. The method according to claim 4, wherein training the embedded neural network model to obtain the embedded neural network model that completes the first training if the first target watermark embedded data indicates that the target watermark information is not completely embedded in the target neural network model, comprises:

using the first weight information of the target neural network model and the target watermark information as a third watermark training set, updating the weight information of the embedded neural network model according to the third watermark training set to obtain the embedded neural network model that completes the first training.

6. The method according to claim 4, wherein training the embedded neural network model to obtain the embedded neural network model that completes the first training if the first target watermark embedded data indicates that the target watermark information is not completely embedded in the target neural network model, comprises:

obtaining first weight information of the reference neural network model, the reference neural network model and the target neural network model having a same structure, wherein the random noise information is not completely embedded in the first weight information of the reference neural network model; and using the first weight information of the reference neural network model, the random noise information, the first weight information of the target neural network model, and the target watermark information as a fourth watermark training set, and updating the weight information of the embedded neural network model according to the fourth watermark training set to obtain the embedded neural network model that completes the first training.

7. The method according to claim 1, wherein updating the weight information of the target neural network model according to the target watermark embedded data provided by the embedded neural network model to obtain the target neural network model embedded with the target watermark information comprises:

obtaining a regular term for embedding the target watermark information according to the target watermark embedded data;

adding the regular term for embedding the target watermark information on a basis of a corresponding model loss function when the target neural network model is trained using a conventional training set; and updating the weight information of the target neural network model based on the model loss function and the regular term for embedding the target watermark information, and obtaining the target neural network model embedded with the target watermark information.

8. The method according to claim 1, wherein the embedded neural network model is used for obtaining the target watermark embedded data according to the weight information of the target neural network model, and the target watermark embedded data is used for representing an embedding degree of embedded watermark information in the target neural network model.

9. One or more computer readable media storing executable instructions that, when executed by one or more processors, cause the one or more processors to perform operations comprising:

obtaining reference weight information of a reference neural network model that is not embedded with watermark information;

obtaining target weight information of a target neural network model that is embedded with partial watermark information, the reference neural network model and the target neural network model having a same structure; and using the reference weight information and the target weight information as a training set to train a detection neural network model, and adjusting a model training method of the target neural network model according to distinguishability data of the reference weight information and the target weight information outputted by the detection neural network model, and obtaining a target neural network model that satisfies a watermark information hiding condition, wherein using the reference weight information and the target weight information as the training set to train the detection neural network model comprises:

using the reference weight information and the target weight information as the training set, and updating the weight information of the detection neural network model according to a model loss function of the detection neural network model.

10. The one or more computer readable media according to claim 9, wherein using the reference weight information and the target weight information as the training set to train the detection neural network model, and adjusting the model training method of the target neural network model according to the distinguishability data of the reference weight information and the target weight information outputted by the detection neural network model to obtain the target neural network model that satisfies the watermark information hiding condition, comprise:

obtaining first distinguishability data of the reference weight information and the target weight information outputted by the detection neural network model;

determining a target neural network model corresponding to the first distinguishability data as the target neural network model that satisfies the watermark information hiding condition if the first distinguishability data indicates that the reference weight information and the target weight information is indistinguishable.

11. The one or more computer readable media according to claim 9, wherein using the reference weight information and the target weight information as the training set to train the detection neural network model, and adjusting the model training method of the target neural network model according to the distinguishability data of the reference weight information and the target weight information outputted by the detection neural network model to obtain the target neural network model that satisfies the watermark information hiding condition, comprise:

using the reference weight information and first target weight information as the training set to train the detection neural network model;

obtaining first distinguishability data of the reference weight information and the first target weight information outputted by the detection neural network model;

providing the first distinguishability data to the target neural network model to allow the target neural network model to update the target weight information of the target neural network model according to the first distinguishability data and obtain second target weight information if the first distinguishability data indicates that the reference weight information is distinguishable from the first target weight information; and repeating the steps of using, obtaining, and providing with the reference weight information and the second target weight information as the training set until target distinguishability data satisfying a preset watermark information hiding condition is obtained, and a target neural network model corresponding to the target distinguishability data is determined as the target neural network model that satisfies the watermark information hiding condition.

12. The one or more computer readable media according to claim 9, wherein using the reference weight information and the target weight information as the training set to train the detection neural network model comprises:

sorting the reference weight information, and adding label information that is not embedded with watermark information to the sorted reference weight information;

sorting the target weight information, and add label information that is embedded with watermark information to the sorted target weight information; and using the sorted reference weight information and the label information thereof as a first training sample, using the sorted target weight information and the label information thereof as a second training sample, training the detection neural network model according to the first training sample and the second training sample, to enable the detection neural network model to be able to distinguish between the reference weight information and the target weight information.

13. The one or more computer readable media according to claim 9, wherein adjusting the model training method of the target neural network model according to the distinguishability data of the reference weight information and the target weight information outputted by the detection neural network model comprises:

obtaining a regular term used for hiding the watermark information according to the distinguishability data;

adding the regular term used for hiding the watermark information on a basis of a corresponding model loss function when a conventional training set is used to train the target neural network model and a regular term used for embedding the watermark information, and obtaining a target loss function corresponding to the target neural network model; and updating the target weight information of the target neural network model based on the target loss function.

14. An apparatus comprising:
one or more processors; and
memory storing executable instructions that, when executed by the one or more processors, cause the one or more processors to perform operations comprising:
obtaining weight information of a target neural network model;
obtaining target watermark information; and
using the target watermark information and the weight information of the target neural network model to train an embedded neural network model, and updating the weight information of the target neural network model according to target watermark embedded data provided by the embedded neural network model to obtain the target neural network model embedded with the target watermark information, wherein using the target watermark information and the weight information of the target neural network model to train the embedded neural network model comprises:

obtaining random noise information;

using the weight information of the target neural network model as an instance of a first watermark training set, and using the target watermark information as a label of the first watermark training set;

using weight information of a reference neural network model as an instance of a second watermark training set, and using the random noise information as a label of the second watermark training set, the reference neural network model being a neural network model without the target watermark information embedded; and using the first watermark training set and the second watermark training set as a new training set, and updating the weight information of the embedded neural network model according to a model loss function of the embedded neural network model until the model loss function converges.

15. The apparatus according to claim 14, wherein using the target watermark information and the weight information of the target neural network model to train the embedded neural network model comprises:

obtaining the weight information of the reference neural network model, the reference neural network model being a pre-trained model without the watermark information embedded, and the reference neural network model and the target neural network model having a same structure; and training the embedded neural network model according to the weight information of the reference neural network model, the random noise information, the weight information of the target neural network model and the target watermark information, wherein the random noise information and the target watermark information having a same structure.

16. The apparatus according to claim 14, wherein updating the weight information of the target neural network model according to the target watermark embedded data provided by the embedded neural network model to obtain the target neural network model embedded with the target watermark information comprises:

inputting first weight information of the target neural network model into the embedded neural network model;

obtaining first target watermark embedded data outputted by the embedded neural network model, the first target watermark embedded data including watermark information extracted from the first weight information of the target neural network model by the embedded neural network model;

terminating the training of the embedded neural network model if the first target watermark embedded data indicates that the target watermark information has been embedded in the first weight information, and determining that a target neural network model corresponding to the first weight information as the target neural network model embedded with the target watermark information.

17. The apparatus according to claim 14, wherein updating the weight information of the target neural network model according to the target watermark embedded data provided by the embedded neural network model to obtain the target neural network model embedded with the target watermark information comprises:
  obtaining a regular term for embedding the target watermark information according to the target watermark embedded data;
  adding the regular term for embedding the target watermark information on a basis of a corresponding model loss function when the target neural network model is trained using a conventional training set; and
  updating the weight information of the target neural network model based on the model loss function and the regular term for embedding the target watermark information, and obtaining the target neural network model embedded with the target watermark information.

18. The apparatus according to claim 14, wherein the embedded neural network model is used for obtaining the target watermark embedded data according to the weight information of the target neural network model, and the target watermark embedded data is used for representing an embedding degree of embedded watermark information in the target neural network model.

* * * * *